(12) United States Patent
Lomasney

(10) Patent No.: US 12,076,965 B2
(45) Date of Patent: Sep. 3, 2024

(54) TOPOLOGY OPTIMIZED HIGH INTERFACE PACKING STRUCTURES

(71) Applicant: MODUMETAL, INC., Seattle, WA (US)

(72) Inventor: Christina A. Lomasney, Seattle, WA (US)

(73) Assignee: Modumetal, Inc., Snohomish, WA (US)

(*) Notice: Subject to any disclaimer, the term of this patent is extended or adjusted under 35 U.S.C. 154(b) by 29 days.

(21) Appl. No.: 16/346,843

(22) PCT Filed: Nov. 2, 2017

(86) PCT No.: PCT/US2017/059794
§ 371 (c)(1),
(2) Date: May 1, 2019

(87) PCT Pub. No.: WO2018/085591
PCT Pub. Date: May 11, 2018

(65) Prior Publication Data
US 2020/0173032 A1 Jun. 4, 2020

Related U.S. Application Data

(60) Provisional application No. 62/416,619, filed on Nov. 2, 2016.

(51) Int. Cl.
*B32B 3/12* (2006.01)
*B32B 15/01* (2006.01)
(Continued)

(52) U.S. Cl.
CPC ............ *B32B 3/12* (2013.01); *C23C 18/1644* (2013.01); *C23C 28/021* (2013.01); *C25D 3/562* (2013.01);
(Continued)

(58) Field of Classification Search
CPC ............ B32B 15/00; B32B 7/00; B32B 7/02; B32B 7/022; B32B 7/025; B32B 7/027
See application file for complete search history.

(56) References Cited

U.S. PATENT DOCUMENTS

| | | |
|---|---|---|
| 1,733,404 A | 10/1929 | Fahrenwald |
| 1,982,009 A | 11/1934 | McKinney et al. |

(Continued)

FOREIGN PATENT DOCUMENTS

| | | |
|---|---|---|
| CN | 1236024 A | 11/1999 |
| CN | 1380446 A | 11/2002 |

(Continued)

OTHER PUBLICATIONS

"Appendix 1: Literature review (Task 1): Literature review concerning the improvement of galvanneal (GA) coating adherence during shear test of adhesively bonded GA steel sheets," 70 pages, Progress Report No. 1 to Galvanized Autobody Partnership Program of International Zinc Association, Brussels, Belgium, Jun. 2008-Jul. 2009, Issued: Sep. 2009 . . . .

(Continued)

*Primary Examiner* — Adam Krupicka
(74) *Attorney, Agent, or Firm* — Seed IP Law Group LLP

(57) ABSTRACT

The present disclosure provides articles comprising a laminate material having a void volume of at least 40%, having a lattice structure comprising a plurality of interconnected struts forming polyhedrons in a series that extends in three dimensions, or both, where the laminate materials have an interface density of at least 2.0 interfaces/micrometer (μm). Also described are methods for forming the same.

24 Claims, 14 Drawing Sheets

(51) Int. Cl.
*C23C 18/16* (2006.01)
*C23C 28/02* (2006.01)
*C25D 3/56* (2006.01)
*C25D 5/00* (2006.01)
*C25D 5/10* (2006.01)
*C25D 5/18* (2006.01)

(52) U.S. Cl.
CPC ............... *C25D 5/10* (2013.01); *C25D 5/18* (2013.01); *C25D 5/605* (2020.08); *C25D 5/611* (2020.08); *C25D 5/617* (2020.08); *C25D 5/619* (2020.08); *C25D 5/627* (2020.08); *B32B 15/01* (2013.01)

(56) References Cited

U.S. PATENT DOCUMENTS

| | | |
|---|---|---|
| 2,428,033 A | 9/1947 | Nachtman |
| 2,436,316 A | 2/1948 | Lum et al. |
| 2,470,775 A | 5/1949 | Jernstedt et al. |
| 2,558,090 A | 6/1951 | Jernstedt |
| 2,642,654 A | 6/1953 | Ahrens |
| 2,678,909 A | 5/1954 | Jernstedt et al. |
| 2,694,743 A | 11/1954 | Ruskin et al. |
| 2,706,170 A | 4/1955 | Marchese |
| 2,891,309 A | 6/1959 | Fenster |
| 3,090,733 A | 5/1963 | Brown |
| 3,255,781 A | 6/1966 | Gillespie, Jr. |
| 3,282,810 A | 11/1966 | Odekerken |
| 3,355,374 A | 11/1967 | Brewer et al. |
| 3,359,469 A | 12/1967 | Levy et al. |
| 3,362,851 A | 1/1968 | Dunster |
| 3,483,113 A | 12/1969 | Carter |
| 3,549,505 A | 12/1970 | Hanusa |
| 3,616,286 A | 10/1971 | Aylward et al. |
| 3,633,520 A | 1/1972 | Stiglich, Jr. |
| 3,669,865 A | 6/1972 | Semienko et al. |
| 3,673,073 A | 6/1972 | Tobey et al. |
| 3,716,464 A | 2/1973 | Kovac et al. |
| 3,753,664 A | 8/1973 | Klingenmaier et al. |
| 3,759,799 A | 9/1973 | Reinke |
| 3,787,244 A | 1/1974 | Schulmeister et al. |
| 3,866,289 A | 2/1975 | Brown et al. |
| 3,941,674 A | 5/1976 | Vanmunster |
| 3,994,694 A | 11/1976 | Clauss et al. |
| 3,996,114 A | 12/1976 | Ehrsam |
| 4,053,371 A | 10/1977 | Towsley |
| 4,105,526 A | 8/1978 | Lewellen, Jr. et al. |
| 4,107,003 A | 8/1978 | Anselrode |
| 4,125,447 A | 11/1978 | Bachert |
| 4,191,617 A | 3/1980 | Hurley et al. |
| 4,204,918 A | 5/1980 | McIntyre et al. |
| 4,216,272 A | 8/1980 | Clauss |
| 4,246,057 A | 1/1981 | Janowski et al. |
| 4,269,672 A | 5/1981 | Inoue |
| 4,284,688 A | 8/1981 | Stücheli et al. |
| 4,314,893 A | 2/1982 | Clauss |
| 4,405,427 A | 9/1983 | Byrd |
| 4,422,907 A | 12/1983 | Birkmaier et al. |
| 4,461,680 A | 7/1984 | Lashmore |
| 4,464,232 A | 8/1984 | Wakano et al. |
| 4,510,209 A | 4/1985 | Hada et al. |
| 4,519,878 A | 5/1985 | Hara et al. |
| 4,529,492 A | 7/1985 | Buchholz et al. |
| 4,540,472 A | 9/1985 | Johnson et al. |
| 4,543,300 A | 9/1985 | Hara et al. |
| 4,543,803 A | 10/1985 | Keyasko |
| 4,591,418 A | 5/1986 | Snyder |
| 4,592,808 A | 6/1986 | Doubt |
| 4,597,836 A | 7/1986 | Schaer et al. |
| 4,613,388 A | 9/1986 | Walter et al. |
| 4,620,661 A | 11/1986 | Slatterly |
| 4,652,348 A | 3/1987 | Yahalom et al. |
| 4,666,567 A | 5/1987 | Loch |
| 4,670,356 A | 6/1987 | Sato et al. |
| 4,678,552 A | 7/1987 | Chen |
| 4,678,721 A | 7/1987 | den Broeder et al. |
| 4,702,802 A | 10/1987 | Umino et al. |
| H543 H | 11/1988 | Chen et al. |
| 4,795,735 A | 1/1989 | Liu et al. |
| 4,834,845 A | 5/1989 | Muko et al. |
| 4,839,214 A | 6/1989 | Oda et al. |
| 4,869,971 A | 9/1989 | Nee et al. |
| 4,885,215 A | 12/1989 | Yoshioka et al. |
| 4,904,542 A | 2/1990 | Mroczkowski |
| 4,904,543 A | 2/1990 | Sakakima et al. |
| 4,909,917 A | 3/1990 | Harrison et al. |
| 4,923,574 A | 5/1990 | Cohen |
| 4,975,337 A | 12/1990 | Hyner et al. |
| 5,043,230 A | 8/1991 | Jagannathan et al. |
| 5,045,356 A | 9/1991 | Uemura et al. |
| 5,056,936 A | 10/1991 | Mahrus et al. |
| 5,059,493 A | 10/1991 | Takahata |
| 5,073,237 A | 12/1991 | Bacher et al. |
| 5,079,039 A | 1/1992 | Heraud et al. |
| 5,096,564 A | 3/1992 | Jowitt et al. |
| 5,156,729 A | 10/1992 | Mahrus et al. |
| 5,156,899 A | 10/1992 | Kistrup et al. |
| 5,158,653 A | 10/1992 | Lashmore et al. |
| 5,190,637 A | 3/1993 | Guckel |
| 5,228,967 A | 7/1993 | Crites et al. |
| 5,234,562 A | 8/1993 | Uenishi et al. |
| 5,268,235 A | 12/1993 | Lashmore et al. |
| 5,300,165 A | 4/1994 | Sugikawa |
| 5,320,719 A | 6/1994 | Lasbmore et al. |
| 5,326,454 A | 7/1994 | Engelhaupt |
| 5,352,266 A | 10/1994 | Erb et al. |
| 5,364,523 A | 11/1994 | Tanaka et al. |
| 5,378,583 A | 1/1995 | Guckel et al. |
| 5,413,874 A | 5/1995 | Moysan, III et al. |
| 5,431,800 A | 7/1995 | Kirchhoff et al. |
| 5,461,769 A | 10/1995 | McGregor |
| 5,472,795 A | 12/1995 | Atita |
| 5,489,488 A | 2/1996 | Asai et al. |
| 5,500,600 A | 3/1996 | Moyes |
| 5,547,096 A | 4/1996 | Kleyn |
| 5,527,445 A | 6/1996 | Palumbo |
| 5,545,435 A | 8/1996 | Steffier |
| 5,620,800 A | 4/1997 | De Leeuw et al. |
| 5,660,704 A | 8/1997 | Murase |
| 5,679,232 A | 10/1997 | Fedor et al. |
| 5,738,951 A | 4/1998 | Goujard et al. |
| 5,742,471 A | 4/1998 | Barbee, Jr. et al. |
| 5,775,402 A | 7/1998 | Sachs et al. |
| 5,783,259 A | 7/1998 | McDonald |
| 5,798,033 A | 8/1998 | Uemiya et al. |
| 5,800,930 A | 9/1998 | Chen et al. |
| 5,828,526 A | 10/1998 | Kagawa et al. |
| 5,912,069 A | 6/1999 | Yializis et al. |
| 5,930,085 A | 7/1999 | Kitade et al. |
| 5,942,096 A | 8/1999 | Ruzicka et al. |
| 5,952,111 A | 9/1999 | Sugg et al. |
| 5,958,604 A | 9/1999 | Riabkov et al. |
| 6,036,832 A | 3/2000 | Knol et al. |
| 6,036,833 A | 3/2000 | Tang et al. |
| 6,071,398 A | 6/2000 | Martin et al. |
| 6,143,424 A | 11/2000 | Jonte et al. |
| 6,143,430 A | 11/2000 | Miyasaka et al. |
| 6,193,858 B1 | 2/2001 | Hradil et al. |
| 6,200,452 B1 | 3/2001 | Angelini |
| 6,203,936 B1 | 3/2001 | Cisar et al. |
| 6,212,078 B1 | 4/2001 | Hunt et al. |
| 6,214,473 B1 | 4/2001 | Hunt et al. |
| 6,284,357 B1 | 9/2001 | Lackey et al. |
| 6,312,579 B1 | 11/2001 | Bank et al. |
| 6,344,123 B1 | 2/2002 | Bhatnagar |
| 6,355,153 B1 | 3/2002 | Uzoh et al. |
| 6,398,937 B1 | 6/2002 | Menini et al. |
| 6,409,907 B1 | 6/2002 | Braun et al. |
| 6,415,942 B1 | 7/2002 | Fenton et al. |
| 6,461,678 B1 | 10/2002 | Chen et al. |
| 6,466,417 B1 | 10/2002 | Gill |
| 6,468,672 B1 | 10/2002 | Donovan, III et al. |
| 6,482,298 B1 | 11/2002 | Bhatnagar |

(56) References Cited

U.S. PATENT DOCUMENTS

| | | |
|---|---|---|
| 6,537,683 B1 | 3/2003 | Staschko et al. |
| 6,547,944 B2 | 4/2003 | Schreiber et al. |
| 6,592,739 B1 | 7/2003 | Sonoda et al. |
| 6,725,916 B2 | 4/2004 | Gray et al. |
| 6,739,028 B2 | 5/2004 | Sievenpiper et al. |
| 6,777,831 B2 | 8/2004 | Gutiérrez, Jr. et al. |
| 6,800,121 B2 | 10/2004 | Shahin |
| 6,884,499 B2 | 4/2005 | Penich et al. |
| 6,902,827 B2 | 6/2005 | Kelly et al. |
| 6,908,667 B2 | 6/2005 | Christ et al. |
| 6,923,898 B2 | 8/2005 | Yoshimura et al. |
| 6,979,490 B2 | 12/2005 | Steffier |
| 7,285,202 B2 | 10/2007 | Rumpf |
| 7,581,933 B2 | 9/2009 | Bruce et al. |
| 7,632,590 B2 | 12/2009 | Punsalan et al. |
| 7,736,753 B2 | 6/2010 | Deligianni et al. |
| 8,084,564 B2 | 12/2011 | Kano et al. |
| 8,128,752 B2 | 3/2012 | Kim |
| 8,152,985 B2 | 4/2012 | Macary |
| 8,177,945 B2 | 5/2012 | Arvin et al. |
| 8,192,608 B2 | 6/2012 | Matthews |
| 8,253,035 B2 | 8/2012 | Matsumoto |
| 8,293,077 B2 | 10/2012 | Vacheron |
| 8,585,875 B2 | 11/2013 | Cummings et al. |
| 8,617,456 B1 * | 12/2013 | Pechenik ............... B82Y 40/00 |
| | | 264/650 |
| 8,814,437 B2 | 8/2014 | Braun |
| 8,871,065 B2 | 10/2014 | Vacheron |
| 8,916,001 B2 | 12/2014 | Pryce Lewis et al. |
| 9,005,420 B2 | 4/2015 | Tomantschger et al. |
| 9,056,405 B2 | 6/2015 | Sato et al. |
| 9,080,692 B2 | 7/2015 | Tomomori et al. |
| 9,108,506 B2 | 8/2015 | Whitaker et al. |
| 9,115,439 B2 | 8/2015 | Whitaker |
| 9,234,294 B2 | 1/2016 | Whitaker et al. |
| 9,273,932 B2 | 3/2016 | Whitaker et al. |
| 9,732,433 B2 | 8/2017 | Caldwell et al. |
| 9,758,891 B2 | 9/2017 | Bao |
| 9,783,907 B2 | 10/2017 | Cai et al. |
| 9,938,629 B2 | 4/2018 | Whitaker et al. |
| 10,041,185 B2 | 8/2018 | Sukenari |
| 10,253,419 B2 | 4/2019 | Lomasney |
| 10,266,957 B2 | 4/2019 | Sugawara et al. |
| 10,472,727 B2 | 11/2019 | Lomasney |
| 10,513,791 B2 | 12/2019 | Lomasney et al. |
| 10,544,510 B2 | 1/2020 | Lomasney |
| 10,662,542 B2 | 5/2020 | Caldwell et al. |
| 10,689,773 B2 | 6/2020 | Whitaker et al. |
| 10,695,797 B2 | 6/2020 | Andreae et al. |
| 10,781,524 B2 | 9/2020 | Whitaker et al. |
| 10,808,322 B2 | 10/2020 | Whitaker et al. |
| 10,844,504 B2 | 11/2020 | Sklar |
| 10,851,464 B1 | 12/2020 | Kobayashi et al. |
| 10,961,635 B2 | 3/2021 | Whitaker |
| 11,118,280 B2 | 9/2021 | Lomasney et al. |
| 11,168,408 B2 | 11/2021 | Sklar |
| 11,180,864 B2 | 11/2021 | Lomasney |
| 11,242,613 B2 | 2/2022 | Lomasney |
| 11,286,575 B2 | 3/2022 | Lomasney et al. |
| 11,293,272 B2 | 4/2022 | Lomasney |
| 11,365,488 B2 | 6/2022 | Morgan et al. |
| 2001/0003384 A1 | 6/2001 | Morita |
| 2001/0037944 A1 | 11/2001 | Sanada et al. |
| 2002/0011419 A1 | 1/2002 | Arao et al. |
| 2002/0100858 A1 | 8/2002 | Weber |
| 2002/0179449 A1 | 12/2002 | Domeier et al. |
| 2003/0134142 A1 | 7/2003 | Ivey et al. |
| 2003/0234181 A1 | 12/2003 | Palumbo |
| 2003/0236163 A1 | 12/2003 | Chaturvedi et al. |
| 2004/0027715 A1 | 2/2004 | Hixson-Goldsmith et al. |
| 2004/0031691 A1 | 2/2004 | Kelly et al. |
| 2004/0067314 A1 | 4/2004 | Joshi et al. |
| 2004/0154925 A1 | 8/2004 | Podlaha et al. |
| 2004/0178076 A1 | 9/2004 | Stonas et al. |
| 2004/0211672 A1 | 10/2004 | Ishigami et al. |
| 2004/0232005 A1 | 11/2004 | Hubel |
| 2004/0234683 A1 | 11/2004 | Tanaka et al. |
| 2004/0239836 A1 | 12/2004 | Chase |
| 2005/0002228 A1 | 1/2005 | Dieny et al. |
| 2005/0109433 A1 | 5/2005 | Danger et al. |
| 2005/0205425 A1 | 9/2005 | Palumbo et al. |
| 2005/0221100 A1 | 10/2005 | Kirihara et al. |
| 2005/0279640 A1 | 12/2005 | Shimoyama et al. |
| 2006/0065533 A1 | 3/2006 | Inoue et al. |
| 2006/0135281 A1 | 6/2006 | Palumbo et al. |
| 2006/0135282 A1 | 6/2006 | Palumbo et al. |
| 2006/0201817 A1 | 9/2006 | Guggemos et al. |
| 2006/0243597 A1 | 11/2006 | Matefi-Tempfli et al. |
| 2006/0269770 A1 | 11/2006 | Cox et al. |
| 2006/0272949 A1 | 12/2006 | Detor et al. |
| 2006/0286348 A1 | 12/2006 | Sauer |
| 2007/0158204 A1 | 7/2007 | Taylor et al. |
| 2007/0269648 A1 | 11/2007 | Schuh et al. |
| 2007/0278105 A1 | 12/2007 | Ettel |
| 2008/0063866 A1 | 3/2008 | Allen et al. |
| 2008/0093221 A1 | 4/2008 | Basol |
| 2008/0102360 A1 | 5/2008 | Stimits et al. |
| 2008/0226976 A1 | 9/2008 | Stimits |
| 2008/0245669 A1 | 10/2008 | Yoshioka et al. |
| 2008/0271995 A1 | 11/2008 | Savastiouk et al. |
| 2008/0283236 A1 | 11/2008 | Akers et al. |
| 2009/0004465 A1 | 1/2009 | Kano et al. |
| 2009/0101511 A1 | 4/2009 | Lochtman et al. |
| 2009/0114530 A1 | 5/2009 | Noda et al. |
| 2009/0130424 A1 | 5/2009 | Tholen et al. |
| 2009/0130425 A1 | 5/2009 | Whitaker |
| 2009/0130479 A1 | 5/2009 | Detor et al. |
| 2009/0139870 A1 | 6/2009 | Nagai et al. |
| 2009/0155617 A1 | 6/2009 | Kim et al. |
| 2009/0283410 A1 | 11/2009 | Sklar et al. |
| 2010/0078330 A1 | 4/2010 | Hyodo |
| 2010/0116675 A1 | 5/2010 | Sklar et al. |
| 2010/0187117 A1 | 7/2010 | Lingenfelter et al. |
| 2010/0304063 A1 | 12/2010 | McCrea et al. |
| 2010/0304179 A1 | 12/2010 | Facchini et al. |
| 2010/0319757 A1 | 12/2010 | Oetting |
| 2011/0111296 A1 | 5/2011 | Berdichevsky et al. |
| 2011/0162970 A1 | 7/2011 | Sato |
| 2011/0180413 A1 | 7/2011 | Whitaker et al. |
| 2011/0186582 A1 | 8/2011 | Whitaker et al. |
| 2011/0256356 A1 | 10/2011 | Tomantschger et al. |
| 2011/0277313 A1 | 11/2011 | Soracco et al. |
| 2012/0088118 A1 | 4/2012 | Lomasney |
| 2012/0118745 A1 | 5/2012 | Bao |
| 2012/0135270 A1 | 5/2012 | Wilbuer et al. |
| 2012/0231574 A1 | 9/2012 | Wang |
| 2012/0282417 A1 | 11/2012 | Garcia et al. |
| 2013/0052343 A1 | 2/2013 | Dieny et al. |
| 2013/0071755 A1 | 3/2013 | Oguro |
| 2013/0075264 A1 | 3/2013 | Cummings et al. |
| 2013/0130057 A1 | 5/2013 | Caldwell et al. |
| 2013/0186852 A1 | 7/2013 | Dietrich et al. |
| 2013/0220831 A1 | 8/2013 | Vidaurre Heiremans et al. |
| 2013/0224008 A1 | 8/2013 | Cheung et al. |
| 2013/0323473 A1 | 12/2013 | Dietsch et al. |
| 2014/0163717 A1 | 6/2014 | Das et al. |
| 2014/0178637 A1 | 6/2014 | Rajagopalan et al. |
| 2014/0231266 A1 | 8/2014 | Sherrer et al. |
| 2015/0315716 A1 | 11/2015 | Whitaker |
| 2015/0322588 A1 | 11/2015 | Lomasney et al. |
| 2016/0002790 A1 | 1/2016 | Whitaker et al. |
| 2016/0002803 A1 | 1/2016 | Sklar |
| 2016/0002806 A1 | 1/2016 | Lomasney |
| 2016/0002813 A1 | 1/2016 | Lomasney |
| 2016/0024663 A1 | 1/2016 | Lomasney |
| 2016/0027425 A1 * | 1/2016 | Cook ................... F28D 7/0058 |
| | | 428/221 |
| 2016/0047980 A1 | 2/2016 | Page et al. |
| 2016/0145850 A1 | 5/2016 | Cook et al. |
| 2016/0159488 A1 | 6/2016 | Roach et al. |
| 2016/0160863 A1 | 6/2016 | Roach et al. |
| 2016/0214283 A1 | 7/2016 | Schick et al. |
| 2017/0016130 A1 | 1/2017 | Testoni et al. |
| 2017/0191177 A1 | 7/2017 | Whitaker et al. |

(56) References Cited

U.S. PATENT DOCUMENTS

| | | |
|---|---|---|
| 2017/0191179 A1 | 7/2017 | Sklar |
| 2017/0275775 A1 | 9/2017 | Guadarrama Calderon et al. |
| 2018/0016692 A1 | 1/2018 | Caldwell et al. |
| 2018/0016694 A1 | 1/2018 | Bao |
| 2018/0066375 A1 | 3/2018 | Morgan et al. |
| 2018/0071980 A1 | 3/2018 | Lomasney et al. |
| 2018/0245229 A1 | 8/2018 | Whitaker et al. |
| 2019/0309430 A1 | 10/2019 | Sklar |
| 2019/0360116 A1 | 11/2019 | Collinson et al. |
| 2020/0115998 A1 | 4/2020 | Lomasney |
| 2020/0131658 A1 | 4/2020 | Lomasney et al. |
| 2020/0277706 A1 | 9/2020 | Lomasney et al. |
| 2020/0283923 A1 | 9/2020 | Lomasney |
| 2020/0318245 A1 | 10/2020 | Lomasney |
| 2020/0354846 A1 | 11/2020 | Whitaker et al. |
| 2020/0392642 A1 | 12/2020 | Lomasney |
| 2021/0054522 A1 | 2/2021 | Lomasney et al. |
| 2021/0071303 A1 | 3/2021 | Whitaker et al. |
| 2022/0081798 A1 | 3/2022 | Collinson et al. |
| 2022/0154357 A1 | 5/2022 | Lomasney |

FOREIGN PATENT DOCUMENTS

| | | | |
|---|---|---|---|
| CN | 1924110 A | 3/2007 | |
| CN | 101113527 A | 1/2008 | |
| CN | 101195924 A | 6/2008 | |
| CN | 201857434 U | 6/2011 | |
| CN | 102148339 A | 8/2011 | |
| CN | 203584787 U | 5/2014 | |
| CN | 105442011 A | 3/2016 | |
| DE | 39 02 057 A1 | 7/1990 | |
| DE | 10 2004 006 441 A1 | 12/2005 | |
| DE | 10 2010 011 087 A1 | 9/2011 | |
| EP | 1 688 518 A2 | 8/2006 | |
| EP | 1 498 976 A3 | 10/2006 | |
| EP | 1 826 294 A1 | 8/2007 | |
| EP | 2 078 607 A1 | 7/2009 | |
| EP | 2 189 554 A1 | 5/2010 | |
| EP | 3 128 045 A1 | 2/2017 | |
| GB | 2 324 813 A | 11/1998 | |
| JP | S47-2005 A | 2/1972 | |
| JP | S47-33925 A | 11/1972 | |
| JP | S52-109439 A | 9/1977 | |
| JP | 58-197292 A | 11/1983 | |
| JP | S60-97774 A | 5/1985 | |
| JP | S61-99692 A | 5/1986 | |
| JP | H01-132793 A | 5/1989 | |
| JP | 2-214618 A | 8/1990 | |
| JP | H05-251849 A | 9/1993 | |
| JP | H06-196324 A | 7/1994 | |
| JP | 07-065347 A | 3/1995 | |
| JP | H09-119000 A | 5/1997 | |
| JP | 2000-239888 A | 9/2000 | |
| JP | 2001-152388 A | 6/2001 | |
| JP | 2001-181893 A | 7/2001 | |
| JP | 2002-53999 A | 2/2002 | |
| JP | 2006-035176 A | 2/2006 | |
| JP | 2009-215590 A | 9/2009 | |
| KR | 2003-0092463 A | 12/2003 | |
| KR | 20-2010-0009670 U | 10/2010 | |
| KR | 10-2015-0132043 A | 11/2015 | |
| SU | 36121 A1 | 4/1934 | |
| WO | 83/02784 A1 | 8/1983 | |
| WO | 95/14116 A1 | 5/1995 | |
| WO | 97/00980 A1 | 1/1997 | |
| WO | 02/33150 A2 | 4/2002 | |
| WO | 03/100484 A2 | 12/2003 | |
| WO | 2004/001100 A1 | 12/2003 | |
| WO | WO-2007021980 A2 * | 2/2007 | ............ B32B 15/00 |
| WO | 2007/045466 A1 | 4/2007 | |
| WO | 2007/136387 A1 | 11/2007 | |
| WO | 2007/138619 A1 | 12/2007 | |
| WO | 2008/057401 A2 | 5/2008 | |
| WO | 2009/045433 A1 | 4/2009 | |
| WO | 2011/033775 A1 | 3/2011 | |
| WO | 2012/145750 A2 | 10/2012 | |
| WO | 2013/133762 A1 | 9/2013 | |
| WO | 2017/097300 A1 | 6/2017 | |

OTHER PUBLICATIONS

"Low-temperature iron plating," web blog article found at http:blog.sina.com.cn/s/blog_48ed0a9c01100024z.html, published Mar. 22, 2006, 3 pages. (with English translation).

Adams et al., "Controlling strength and toughness of multilayer films: A new multiscalar approach," *J. Appl. Phys.* 74(2):1015-1021, 1993.

Aizenberg et al., "Skeleton of *Euplectella* sp.: Structural Hierarchy from the Nanoscale to the Macroscale," *Science* 309:275-278, 2005.

Alfantazi et al., "Synthesis of nanocrystalline Zn—Ni alloy coatings," *JMSLD5* 15(15):1361-1363, 1996.

Atanassov et al., "Electrodeposition and properties of nickel-manganese layers," *Surface and Coatings Technology* 78:144-149, 1996.

Bakonyi et al., "Electrodeposited multilayer films with giant magnetoresistance (GMR): Progress and problems," *Progress in Materials Science* 55:107-245, 2010.

Bartlett et al., "Electrochemical deposition of macroporous platinum, palladium and cobalt films using polystyrene latex sphere templates," *Chem. Commun.*, pp. 1671-1672, 2000.

Beattie et al., "Comparison of Electrodeposited Copper-Zinc Alloys Prepared Individually and Combinatorially," *J. Electrochem. Soc.* 150(11):C802-C806, 2003.

Bird et al., "Giant Magnetoresistance in Electrodeposited Ni/Cu and Co/Cu Multilayers," *J. Electrochem. Soc.* 142(4):L65-L66, 1995.

Blum, "The Structure and Properties of Alternately Electrodeposited Metals," presented at the Fortieth General Meeting of the American Electrochemical Society, Lake Placid, New York, Oct. 1, 1921, 14 pages.

Cohen et al., "Electroplating of Cyclic Multilayered Alloy (CMA) Coatings," *J. Electrochem. Soc.* 130(10):1987-1995, 1983.

Cowles, "High cycle fatigue in aircraft gas turbines—an industry perspective," *International Journal of Fracture* 80(2-3):147-163, 1996.

"Designing with Metals: Dissimilar Metals and The Galvanic Series," 3 pages, http://www.pwrmfg.com/power-manufacturing/technical-info/designing-with-metals/, printed Oct. 5, 2017.

Despic et al., "Electrochemical Formation of Laminar Deposits of Controlled Structure and Composition," *J. Electrochem. Soc.* 136(6):1651-1657, 1989.

Dini et al. "On the High Temperature Ductility Properties of Electrodeposited Sulfamate Nickel," *Plating and Surface Finishing* 65(2):36-40, 1978.

Etminanfar et al., "Corrosion resistance of multilayer coatings of nanolayered Cr/Ni electrodeposited from Cr(III)—Ni(II) bath," *Thin Solid Films* 520:5322-5327, 2012.

Gasser et al., "Materials Design for Acoustic Liners: an Example of Tailored Multifunctional Materials," *Advanced Engineering Materials* 6(1-2):97-102, 2004.

Georgescu et al., "Magnetic Behavior of [Ni/Co—Ni—Mg—N] x n Cylindrical Multilayers prepared by Magnetoelectrolysis," *Phys. Stat. Sol. (a)* 189(3):1051-1055, 2002.

Ghanem et al., "A double templated electrodeposition method for the fabrication of arrays of metal nanodots," *Electrochemistry Communications* 6:447-453, 2004.

"Gold," web page, version: modified Nov. 3, 2008, retrieved from: <URL:http://en.wikipedia.org/wiki/Gold>.

Grimmett et al., "Pulsed Electrodeposition of Iron-Nickel Alloys," *J. Electrochem. Soc.* 137(11):3414-3418, 1990.

Hariyanti, "Electroplating of Cu—Sn Alloys and Compositionally Modulated Multilayers of Cu—Sn—Zn—Ni Alloys on Mild Steel Substrate," Master of Science Thesis, University of Science, Malaysia, Penang, Malaysia, 2007. (81 pages).

Harris et al., "Improved Single Crystal Superalloys, CMSX-4® (SLS)[La+Y] and CMSX-486®," *TMS (The Minerals, Metals & Materials Society), Superalloys*, p. 45-52, 2004.

(56) References Cited

OTHER PUBLICATIONS

Huang et al., "Hardness variation and annealing behavior of a Cr—Ni multilayer electroplated in a trivalent chromium-based bath," Surface and Coatings Technology 203:3320-3324, 2009.
Huang et al., "Characterization of Cr—Ni multilayers electroplated from a chromium(III)-nickel(II) bath using pulse current," Scripta Materialia, 57:61-64, 2007.
Igawa et al., "Fabrication of SiC fiber reinforced SiC composite by chemical vapor infiltration for excellent mechanical properties," Journal of Physics and Chemistry of Solids 66:551-554, 2005.
Ivanov et al., "Corrosion resistance of compositionally modulated multilayered Zn—Ni alloys deposited from a single bath," Journal of Applied Electrochemistry 33:239-244, 2003.
Jeong et al., "The Effect of Grain Size on the Wear Properties of Electrodeposited Nanocrystalline Nickel Coatings," Scripta Mater. 44:493-499, 2001.
Jia et al., "LIGA and Micromolding" Chapter 4, The MEMS Handbook, 2nd edition, CRC Press, Boca Raton, Florida, Edited by Mohamed Gad-el-Hak, 2006.
Kalu et al., "Cyclic voltammetric studies of the effects of time and temperature on the capacitance of electrochemically deposited nickel hydroxide," Journal of Power Sources 92:163-167, 2001.
Kaneko et al., "Vickers hardness and deformation of Ni/Cu nano-multilayers electrodeposited on copper substrates," Eleventh International Conference on Intergranular and Interphase Boundaries 2004, Journal of Material Science 40:3231-3236, 2005.
Karimpoor et al., "Tensile Properties of Bulk Nanocrystalline Hexagonal Cobalt Electrodeposits", Materials Science Forum 386-388:415-420, 2002.
Keckes et al., "Cell-wall recovery after irreversible deformation of wood," Nature Materials 2:810-814, 2003.
Kirilova et al., "Corrosion behaviour of Zn—Co compositionally modulated multilayers electrodeposited from single and dual baths," Journal of Applied Electrochemistry 29:1133-1137, 1999.
Kockar et al., "Effect of potantiostatic waveforms on properties of electrodeposited NiFe alloy films," Eur. Phys. J. B 42:497-501, 2004.
Lashmore et al., "Electrodeposited Cu—Ni Textured Superlattices," J. Electrochem. Soc. 135(5):1218-1221, 1988.
Lashmore et al., "Electrodeposited Multilayer Metallic Coatings", Encyclopedia of Materials Science and Engineering, Supp. vol. 1:136-140, 1988.
Leisner et al., "Methods for electrodepositing composition-modulated alloys," Journal of Materials Processing Technology 58:39-44, 1996.
Leith et al., "Characterization of Flow-Induced Compositional Structure in Electrodeposited NiFe Composition-Modulated Alloys," J. Electrochem. Soc. 145(8):2827-2833, 1998.
Lekka et al., "Corrosion and wear resistant electrodeposited composite coatings," Electrochimica Acta 50:4551-4556, 2005.
Lewis et al., "Stability in thin film multilayers and microlaminates: the role of free energy, structure, and orientation at interfaces and grain boundaries," Scripta Materialia 48:1079-1085, 2003.
Low et al., "Electrodeposition of composite coatings containing nanoparticles in a metal deposit," Surface & Coatings Technology 201:371-383, 2006.
Malone, "New Developments in Electroformed Nickel-Based Structural Alloys," Plating and Surface Finishing 74(1):50-56, 1987.
Marchese, "Stress Reduction of Electrodeposited Nickel," Journal of the Electrochemical Society 99(2):39-43, 1952.
Touchstone Research Laboratory, Ltd., Material Safety Data Sheet, CFOAM Carbon Foams, , 2008.
Meng et al., "Fractography, elastic modulus, and oxidation resistance of Novel metal-intermetallic Ni/$Ni_3$Al multilayer films," J. Mater. Res. 17(4):790-796, 2002.
Naslain et al., "Synthesis of highly tailored ceramic matrix composites by pressure-pulsed CVI," Solid State Ionics 141-142:541-548, 2001.
Naslain, "The design of the fibre-matrix interfacial zone in ceramic matrix composites," Composites Part A 29A: 1145-1155, 1998.
Nicholls, "Advances in Coating Design for High-Performance Gas Turbines," MRS Bulletin:659-670, Sep. 2003.
Onoda et al., "Preparation of amorphous/crystalloid soft magnetic multilayer Ni—Co—B alloy films by electrodeposition," Journal of Magnetism and Magnetic Materials 126(1-3):595-598, 1993.
Parkin et al., "Oscillations in Exchange Coupling and Magnetoresistance in Metallic Superlattice Structures: Co/Ru, Co/Cr, and Fe/Cr," Physical Review Letters 64(19):2304-2307, 1990.
Pilone et al., "Model of Multiple Metal Electrodeposition in Porous Electrodes," Journal of the Electrochemical Society 153(5):D85-D90, 2006.
Podlaha et al., "Induced Codeposition : I. An Experimental Investigation of Ni—Mo Alloys," J. Electrochem. Soc. 143(3):885-892, 1996.
Ross, "Electrodeposited Multilayer Thin Films," Annual Review of Materials Science 24:159-188, 1994.
Rousseau et al., "Single-bath Electrodeposition of Chromium-Nickel Compositionally Modulated Multilayers (CMM) From a Trivalent Chromium Bath," Plating and Surface Finishing:106-110, Sep. 1999.
Saleh et al., "Effects of electroplating on the mechanical properties of stereolithography and laser sintered parts," Rapid Prototyping Journal 10(5)305-315, 2004.
Sanders et al., "Mechanics of hollow sphere foams," Materials Science and Engineering A347:70-85, 2003.
Sartwell et al., "Replacement of Chromium Electroplating on Gas Turbine Engine Components Using Thermal Spray Coatings," Report No. NRL/MR/6170-05-8890, Naval Research Laboratory, 2005.
Schwartz, "Multiple-Layer Alloy Plating," ASM Handbook 5: Surface Engineering:274-276, 1994.
Sherik, "Synthesis, Structure and Properties of Electrodeposited Bulk Nanocrystalline Nickel," Master's Thesis, Queen's University, Ontario, Canada, 1993. (175 pages).
Shishkovski, "Laser synthesis of functionally graded mesostructures and bulk products," FIZMATLIT, Moscow, Russia, pp. 30-38, 2009. (with English Abstract).
Wikipedia, "Silver," URL=http://en.wikipedia.org/wiki/Silver, version modified Nov. 3, 2008.
Simunovich et al., "Electrochemically Layered Copper-Nickel Nanocomposites with Enhanced Hardness," J. Electrochem. Soc. 141(1):L10-L11, 1994.
Sperling et al., "Correlation of stress state and nanohardness via heat treatment of nickel-aluminide multilayer thin films," J. Mater. Res. 19(11):3374-3381, 2004.
Srivastava et al., "Corrosion resistance and microstructure of electrodeposited nickel-cobalt alloy coatings," Surface & Coatings Technology 201:3051-3060, 2006.
Stephenson, Jr., "Development and Utilization of a High Strength Alloy for Electroforming," Plating 53(2):183-192, 1966.
Suresh, "Graded Materials for Resistance to Contact Deformation and Damage," Science 292:2447-2451, 2001.
Switzer et al., "Electrodeposited Ceramic Superlattices," Science 247(4941):444-446, 1990.
Tench et al., "Considerations in Electrodeposition of Compositionally Modulated Alloys," J. Electrochem. Soc. 137(10):3061-3066, 1990.
Tench et al., "Enhanced Tensile Strength for Electrodeposited Nickel-Copper Multilayer Composites," Metallurgical Transactions A 15A:2039-2040, 1984.
Thangaraj et al., "Corrosion behavior of composition modulated multilayer Zn—Co electrodeposits produced using a single-bath technique," J. Appl. Electrochem. 39:339-345, 2009.
Thangaraj et al., "Surface Modification by Compositionally Modulated Multilayered Zn—Fe Coatings," Chinese Journal of Chemistry 26:2285-2291, 2008.
Tokarz et al., "Preparation, structural and mechanical properties of electrodeposited Co/Cu multilayers," Phys. Stat. Sol. 5(11):3526-3529, 2008.
Vill et al., "Mechanical Properties of Tough Multiscalar Microlaminates," Acta metall. mater. 43(2):427-437, 1995.
Voevodin et al., "Superhard, functionally gradient, nanolayered and nanocomposite diamond-like carbon coatings for wear protection," Diamond and Related Materials 7:463-467, 1998.

(56) References Cited

OTHER PUBLICATIONS

Wearmouth et al., "Electroforming with Heat-Resistant, Sulfur-Hardened Nickel," *Plating and Surface Finishing* 66(10):53-57, 1979.
Weil et al., "Pulsed Electrodeposition of Layered Brass Structures," *Metallurgical Transactions A* 19A:1569-1573, 1988.
Weil et al., "Properties of Composite Electrodeposits," *U.S. Army Research Office*, Final Report, Contract No. DAALO3-87-K-0047, 1990.
Wilcox, "Surface Modification With Compositionally Modulated Multilayer Coatings," *The Journal of Corrosion Science and Engineering* 6(Paper 52), 2004.
Wu et al., "Preparation and characterization of superhard $CN_x/ZrN$ multilayers," *J. Vac. Sci. Technol. A* 15(3):946-950, 1997.
Yahalom et al., "Formation of composition-modulated alloys by electrodeposition," *Journal of Materials Science* 22:499-503, 1987.
Yang et al., "Effects of SiC sub-layer on mechanical properties of Tyranno-SA/SiC composites with multiple interlayers," *Ceramics International* 31:525-531, 2005.
Yang et al., "Enhanced elastic modulus in composition-modulated gold-nickel and copper-palladium foils," *Journal of Applied Physics* 48(3):876-879, 1977.
Yogesha et al., "Optimization of deposition conditions for development of high corrosion resistant Zn—Fe multilayer coatings," *Journal of Materials Processing Technology* 211:1409-1415, 2011.
Zabludovsky et al., "The Obtaining of Cobalt Multilayers by Programme-controlled Pulse Current," *Transactions of the Institute of Metal Finishing* 75(5):203-204, 1997.
Kruth et al., "Progress in Additive Manufacturing and Rapid Prototyping" *CIRP Annals* 47(2):525-540, 1998.
U.S. Appl. No. 16/346,843, filed May 1, 2019.
U.S. Appl. No. 16/496,925, filed Sep. 23, 2019.
U.S. Appl. No. 16/582,931, filed Sep. 25, 2019.
U.S. Appl. No. 16/606,723, filed Oct. 18, 2019.
U.S. Appl. No. 16/671,104, filed Oct. 31, 2019.
U.S. Appl. No. 16/726,079, filed Dec. 23, 2019.
Paz et al., "Nano-Laminated Alloys for Improved Return on Oilfield Assets," Society of Petroleum Engineers, 2016 (14 pages).
U.S. Appl. No. 17/024,007, filed Sep. 17, 2020.
U.S. Appl. No. 17/050,395, filed Oct. 23, 2020.
U.S. Appl. No. 17/077,970, filed Oct. 22, 2020.
U.S. Appl. No. 17/179,351, filed Feb. 18, 2021.
Dulal et al., "Characterisation of Co—Ni(Cu)/Cu multilayers deposited from a citrate electrolyte in a flow channel cell," *Electrochimica Acta* 49:2041-2049, 2004.
Kalantary et al., "The Production of Compositionally Modulated Alloys By Simulated High Speed Electrodeposition From A Single Solution," *Electrochimica Acta* 40(11):1609-1616, 1995.
Nabiyouni et al., "Growth, characterization and magnetoresistive study of electrodeposited Ni/Cu and Co—Ni/Cu multilayers," *Journal of Crystal Growth* 275:e1259-e1262, 2005.
U.S. Appl. No. 17/678,841, filed Feb. 23, 2022.

\* cited by examiner

Simulated nickel deposition within a porous structure

TOPOLOGY OPTIMIZED HIGH INTERFACE PACKING STRUCTURES

BACKGROUND

Technical Field

The present disclosure generally relates to articles comprising high interface packing materials having porous structures, as well as methods for preparation of the same.

Background

Nature provides many examples of the incorporation of dissimilar materials in a laminated structure, to produce a composite material that is harder and tougher than mixtures of the same materials would otherwise predict. Researchers have reported successful emulation of nature's toughening mechanisms by configuring ceramic and polymer matrices in a laminated structure. The resulting materials exhibited toughness more than 300 times (in energy terms) that of their constituents.

Nature's evolution of high-efficiency structural materials over many thousands of years has resulted in materials which are among the lightest, toughest, and hardest known to man. The materials have evolved to enable mobility, protection, and survivability of species. Among the structures evolved by nature are lightweight yet strong bones (FIG. 1B; see, e.g., MacRae, A., Fossil Dinosaur Bone Microstructure, University of Calgary at Alberta), the tough toucan beak (FIG. 1A; see, e.g., Meyers, M. Engineers Discover Why Toucan Beaks are Models of Lightweight Strength, UCSD School of Engineering Newsletter (2005)), and the hard and tough shells of oysters and other sea creatures (FIG. 1C; see, e.g., R. Z. Wang, et al., Deformation Mechanisms in Nacre, Journal of Materials Research 16(9) 2485-93 (2001)). These natural materials exhibit an elegant combination of material properties that are typically mutually-exclusive in man-made materials and have heretofore eluded material engineers.

There remains a need in the art for improved laminate materials having high strength, toughness, and/or hardness, as well as low density and/or weight. The present disclosure provides this and other related advantages.

BRIEF SUMMARY

The present disclosure describes improved materials and methods that utilize multi-scalar, topology optimization, and lamination to deliver high interface packing (HIP) materials, such as engineered structural materials (ESM), which defy the conventional material-property tradeoffs encountered in homogeneous, bulk materials. Among the structured materials made possible by the methods described herein are topologically optimized lightweight and ultra-high-performance structural materials made possible by combining tailorable nanolaminated structures having HIP (see, e.g., the SEM in FIG. 2A) that can be prepared using room-temperature processes including electrodeposition processes.

Electrodeposition offers a low-cost method for joining dissimilar material in a laminated structure by forming a laminated material on a variety of conductive materials, including metals, alloys, conductive polymers, or polymers rendered conductive by application of a conductive coating. Such laminated materials may be tailored to produce materials having structural properties that have unique and desirable performance attributes such as increased yield strength toughness with a lower density when compared with an uncoated workpiece.

Embodiments of the present disclosure provide methods for the production of composite structures including a HIP material onto three-dimensional (3D) structures. Further embodiments provide for the precise control of material properties and performance by controlling the material's topology (density gradation) and interface density (lamination). The disclosure further describes the development of a multi-scalar performance model that enables the reliable modeling of architectural control parameters at scales spanning nanometer to millimeter length.

The disclosure describes a performance model which may be coupled with a production model to demonstrate the feasibility for determining both structural parameters which result in optimal performance, and electrochemical process parameters which enable the microstructural and nanostructural control necessary to produce the targeted microstructural features. Moreover, the disclosure describes decoupling the inter-dependency of hardness and toughness to manufacture a material which exhibits an advantageous combination of high modulus (stiffness) and low density.

In some embodiments, the configuration-controlled materials exhibit laminar architectural control as well as spatial density to produce controlled, HIP materials that do not exhibit the same material property tradeoffs as conventional, homogeneous composites. In particular, materials described herein can achieve at least a ten-fold increase in yield strength relative to a homogeneous alloy of similar composition with 10-100 fold lower density or ten-fold increase in toughness with a comparable increase in strength or hardness as compared to a homogeneous alloy.

In still further embodiments, the use of laminate materials with HIP applied onto 3D structures including density-graded 3D structures and 3D polyhedron structures results in ESM having a combination of performance characteristics such as low weight and/or density combined with strength, toughness, and/or hardness. Such combined performance characteristics are not available from a fully dense homogenous material.

In aspects, the present disclosure provides an article comprising a laminate material having a void volume of at least 40%, the laminate material having an interface density of at least 2.0 interfaces/micrometer (μm).

In further aspects, the present disclosure provides an article comprising a laminate material having a lattice structure comprising a plurality of interconnected struts forming polyhedrons in a series that extends in three dimensions, the laminate material having an interface density of at least 2.0 interfaces/micrometer (μm).

In yet further aspects, the present disclosure provides a method of forming an article of the present disclosure, comprising depositing a laminate material having an interface density of at least 2.0 layers/micrometer (μm) on a surface of a workpiece.

BRIEF DESCRIPTION OF THE SEVERAL VIEWS OF THE DRAWINGS

The detailed description is described with reference to the accompanying figures.

FIG. 1A shows the density-graded structure of a toucan beak; FIG. 1B shows a density-graded bone; and FIG. 1C shows a laminated nacre shell.

FIG. 5A shows experimental, nanolaminated metal/polymer structure; FIG. 5B shows SEM of nanolaminated iron alloy for a structural application; and FIG. 5C shows an experimental thermal barrier alloy comprising $NiAl_2O_3$/Pt.

FIG. 10A shows a unit cell of a foam or foam-like structure; FIG. 10B shows microscopic size ligaments; and FIG. 10C shows a bimaterial nanolayer structure within the nanolaminate materials showing a substrate (stippled) and a laminate material containing layers of Nb (\\\\) and Cu (////). The nanolaminate material layers vary in thickness, having a gradient decreasing in size from the layer closest to the substrate to the outermost layer.

In FIG. 13A, the substrate (foam) has a substantially uniform density. In FIG. 13B and FIG. 13C the density of the substrate (foam) has an increasing density toward the bottom of the figure (in the direction of the arrow between FIG. 13B and FIG. 13C). In FIG. 13B, the density is increased due to an increase in the thickness of the elements of the substrate forming the cells of the foam. In contrast, in FIG. 13C, the density is increased due to the smaller size of the cells making up the foam, although the thickness of the substrate elements making up the cells of the foam substrate remain substantially uniform.

DETAILED DESCRIPTION

The present disclosure is generally directed to articles comprising high interface packing (HIP) materials having porous structures, as well as methods of making and using the same.

Prior to setting forth this disclosure in more detail, it may be helpful to an understanding thereof to provide definitions of certain terms to be used herein. Additional definitions are set forth throughout this disclosure.

"Workpiece" includes any item with a surface onto which a laminate material is electrodeposited. In other words, a workpiece is an object possessing a shape such that, after applying a given thickness of laminate material, yields an article with the desired shape and properties. Workpieces include substrates, which are objects on which a laminate material is applied, and mandrels, which are coated substrates from which the substrate is removed after formation. Workpieces can be formed of a conductive material (e.g., a metal), formed of a mixture of conductive and non-conductive materials (e.g., a polymer-metal mixture), or coated with a conductive material (e.g., non-conductive material coated with a metal layer through electroless deposition).

In embodiments, a workpiece is made of a polymeric material. In some embodiments, polymeric material includes arylamides, acrylamides, polybenzimidazole (PBI), polyetherimide, polyetherketoneketone (PEKK), polyether ether ketone (PEEK), polyamide, polyimide, polyamide-imides, polyphenylene oxide (PPO), polystyrene (PS), polyphenylene oxide (PPO) and polystyrene (PS), polyphthalamide (PPA), polyvinyl alcohol (PVA), acrylonitrile butadiene styrene (ABS), polycarbonate (PC), polylactic acid (PLA), PC/ABS, cellulose fiber, polyphenylsulfone (PPSU), thermosets, PBI-PEEK, urea, epoxies, cyanate esters, polyurethanes, or any combination thereof. In some embodiments, a polymeric material is a plastic material.

In other embodiments, a workpiece is made of a metal or an alloy. In some embodiments, the metal is a steel alloy. In such embodiments, the steel alloy may include: C and Fe; C, Fe, and Mo; or C, Fe, Mo, and Co. In further embodiments, the alloy may comprise Al, Cu, W, Mo, or Ti.

A workpiece employed in embodiments of the present disclosure may be any suitable workpiece. Suitable workpieces are generally porous materials.

Figures 10A, 10B, 10C:
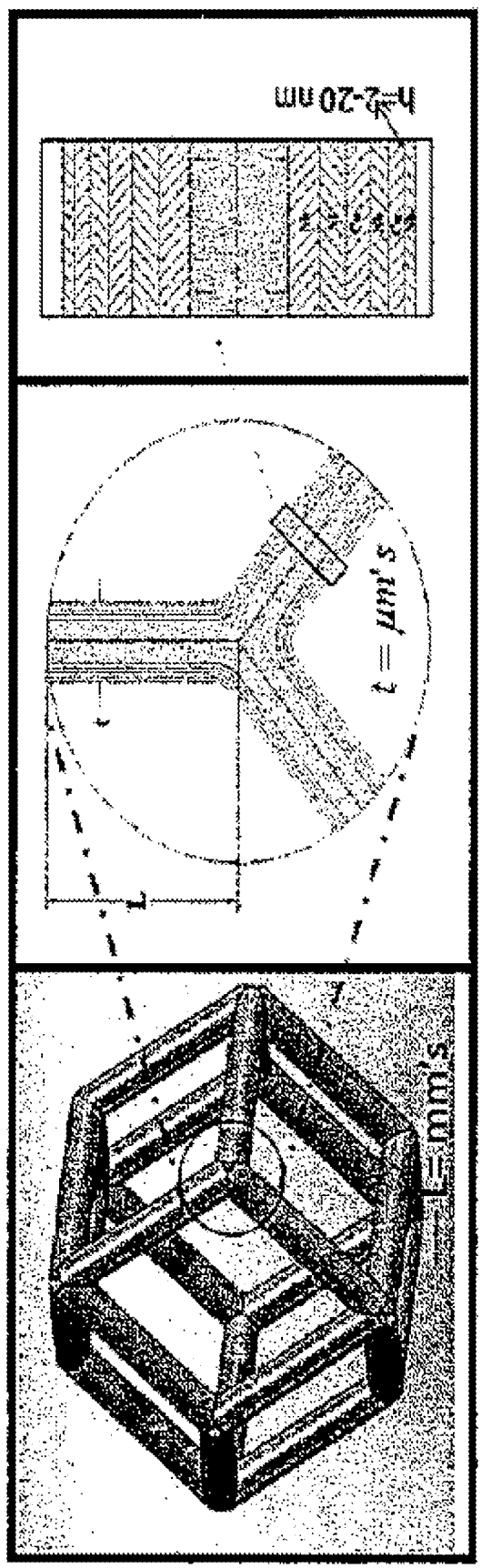
FIGS. 10A-10C illustrates multiscale, nanolaminated foam-like materials.
Figure 11:
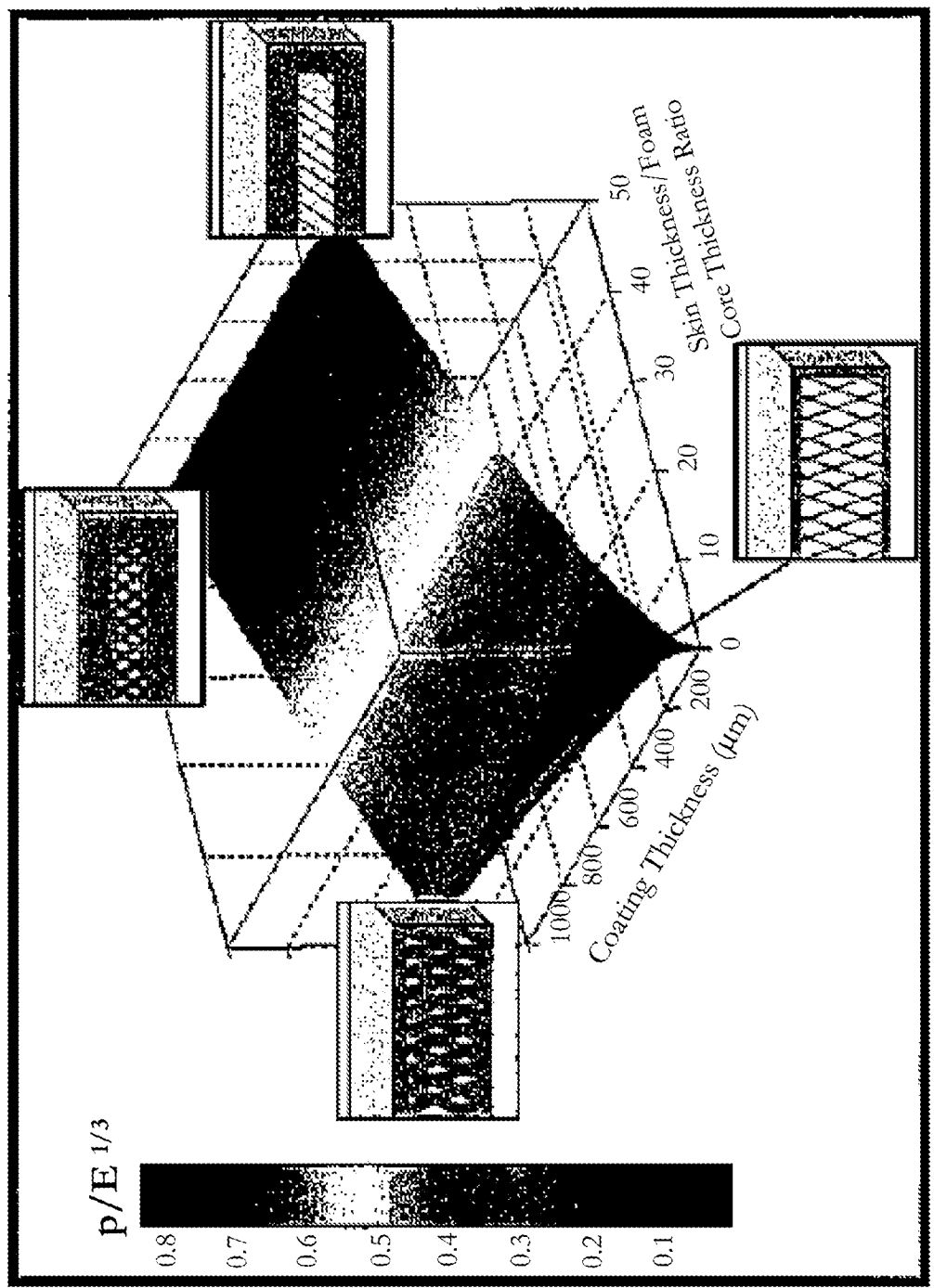
FIG. 11 provides a graphic depiction of a topology optimization space.

"Porous materials," including foams, are three-dimensional materials comprised of at least partially hollow void structures (also referred to as "cells") made of a series of at least partially hollow polyhedrons. Examples of porous materials include FIG. 8, FIG. 10A, and FIG. 11. Each porous material has a "void volume," which is a measure of the "empty" space in the material. In other words, a void volume is the fraction of the volume of the voids over the total volume of the material. A porous material may be closed-cell, in which the individual void structures are fully encased in the material from which the porous material was prepared, or open-cell, in which the individual void structures are connected to each other such that fluid or gas can pass into and/or through the voids in the porous material, or include both open and closed cells. In some embodiments, an open-cell porous material includes some closed cells. In some embodiments, the open-cell porous material includes one or more sections of closed cells. In some embodiments, porous materials may be an open-cell foam.

In some embodiments, a porous material forms a lattice structure with "struts" (i.e., lattice elements) that extend between vertices of polyhedrons thereby defining open void structures. Such struts are generally on the order of millimeters larger. In some embodiments, such struts are on the order of millimeters or centimeters. Porous materials may be comprised of repeating unit cells of regular polyhedrons, irregular polyhedrons, or a combination thereof. Accordingly, in some embodiments, a porous material is a lattice structure comprising a plurality of interconnected struts forming polyhedrons in a series that extends in three dimensions. See, e.g., FIGS. 11 and 12. In certain embodiments, a lattice structure is formed from a plurality of polyhedrons in which at least one face of the polyhedrons remain, while the remainder of the faces of the polyhedrons are not present.

A "polygon" is a planar figure with at least three substantially straight sides and at least three angles. A "regular polygon" is a polygon in which all angles are substantially equal in measure and all sides have substantially the same length.

A "polyhedron" is a three-dimensional geometric structure with substantially flat polygonal faces, substantially straight edges, and vertices. A "uniform polyhedron" is a polyhedron which has regular polygons as faces and is vertex-transitive. A "regular polyhedron" is a polyhedron with identical faces that may be in the form of convex regular polyhedrons or star polyhedrons. An "irregular polyhedron" is a polyhedron with at least one face that is not identical to the remaining faces. A "triangulated" polyhedron is a polyhedron in which all faces are formed by triangles.

Figure 8:
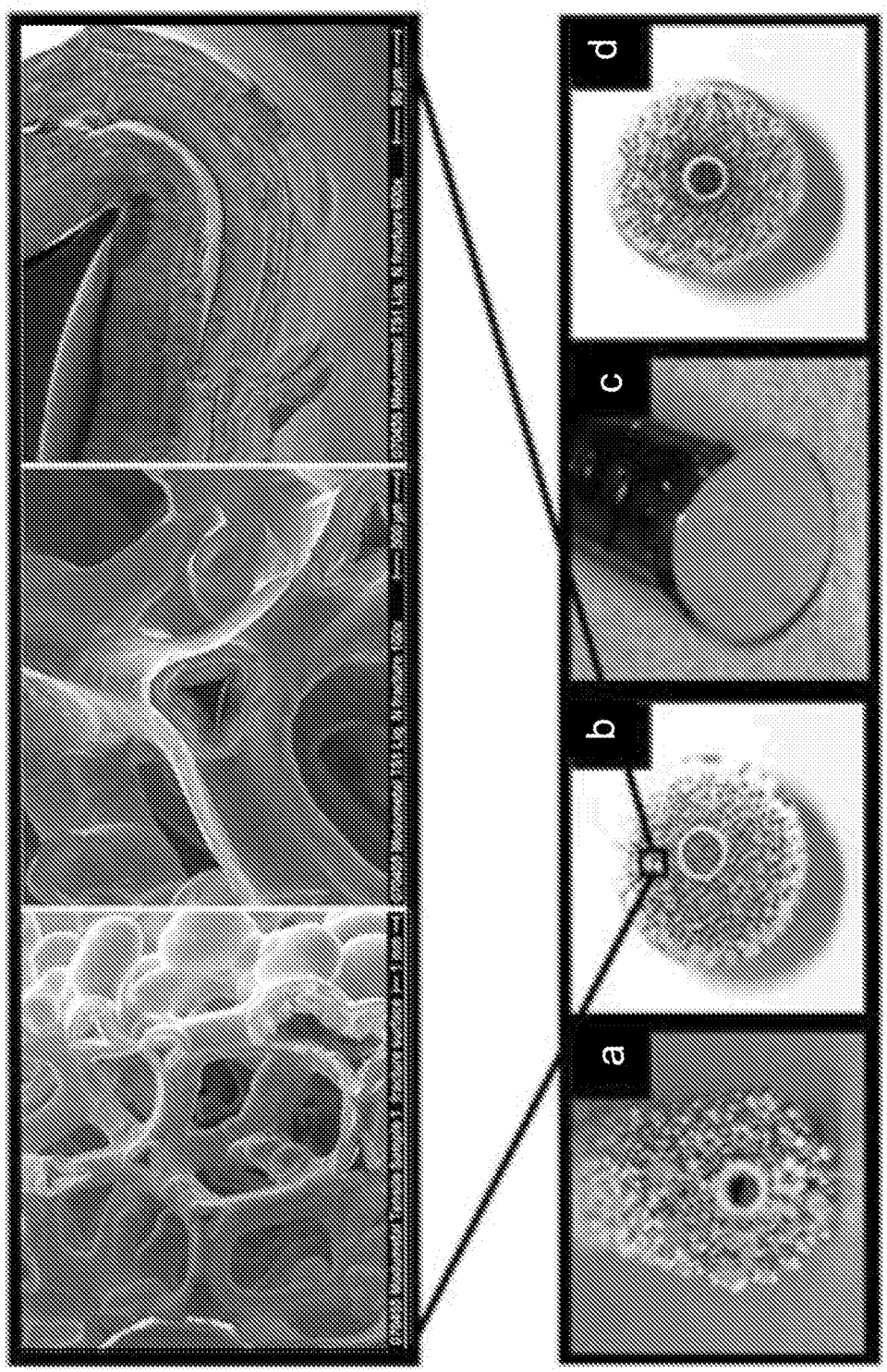
FIG. 8 shows the results of using electrodeposition to make topology-optimized microstructures including spatially controlled laminated/nanolaminated surface density (note the fully dense exterior of the finished item).

"Foam" as used herein is a material generally formed by trapping pockets of gas in a liquid or solid. By trapping pockets of gas in a liquid under conditions where the liquid solidifies, a network of cells is produced within the resulting solid. See, e.g., FIG. 8. As can be seen in FIG. 8, a foam may comprise a series of irregular polyhedrons.

Foams may be closed-cell, in which the individual pockets are fully encased in the material from which the foam was prepared, or open-cell, in which the pockets are connected to each other such that fluid or gas can pass into and/or through the voids in the foam, or include both open and closed cells. In some embodiments, an open-cell foam includes some closed cells. In such embodiments, the open-cell foam may include one or more sections of closed cells.

A variety of foams, including non-structural polymeric foams and pyrolyzed polymer foams, may be used as workpieces for the preparation of articles described herein. In some embodiments, such foams are used in the process of producing ESM. The foams utilized are typically open-cell, which permits the electrodeposition of HIP materials, including ESM. However, foams that are a mixture of open and closed cells also may be employed. In some such embodiments, an ESM is produced on a portion of the foam workpiece and another portion of the foam workpiece is left untreated.

Among the polymeric foams that may be employed are polymeric foams comprised of Acrylonitrile-Butadiene-Sytrene (ABS), polyurethanes, polystyrenes, polycarbonates, polypropylenes, polyvinyl chlorides, and other thermoplastic polymeric materials. Thermoset foam materials include allylics, alkyds, epoxies, phenolics, polyesters, and vinyl esters. In addition, reticulated foams, such as reticulated vitreous carbon foams (e.g., DUOCEL® from ERG Corp. or CFOAM® from Touchstone Research Laboratory) may be employed. Triangulated foam cores also may be employed.

In embodiments, a workpiece for use in the present disclosure may be formed using any suitable methods.

Foam workpieces, particularly polymeric foam workpieces, may be prepared by any means known in the art (e.g., the use of physical or chemical blowing/foaming agents) including blow molding. Where foam workpieces have gradients in cell size they may be prepared using techniques that introduce varying amounts of blowing/foaming agents into the different layers of liquids employed to prepare the foams. Alternatively, a gradient in foam cell size may be achieved by heating thermoplastic foams having substantially uniform cell size to partially collapse the foam. In addition, where steps in foam cell size are desired, foams of different porosity may be used to prepare laminated workpieces.

In some embodiments, a workpiece is prepared by additive manufacturing. "Additive manufacturing" means the preparation of three-dimensional workpieces by the sequential addition of materials. The process includes all forms of direct digital manufacturing, including direct digital deposition, three-dimensional printing (3D printing), selective laser sintering (SLS), sintering laser melting (SLM), fused deposition modeling (FDM), stereolithography (SLA), continuous liquid interface printing (CLIP), Vat photopolymerization, binder jetting, directed energy deposition, cutting and/or forming of woven or non-woven fabrics, and cutting and/or forming of foam sheets.

"Direct digital manufacturing," "rapid prototyped" or "rapid prototyping" means the additive manufacturing process of making a three-dimensional solid workpiece of any shape from a digital model. The process is an additive one, wherein successive layers, ribbons, beads, or areas of material are laid down or solidified in different shapes to form a three-dimensional article.

"Selective laser sintering" (SLS) refers to a process wherein a bed of powder is locally bonded by the action of a laser to form one cross section of a workpiece at a time.

"Fused Deposition Modeling" (FDM) refers to a process wherein molten material (e.g., thermoplastic) is used to sequentially build up a workpiece of a desired shape.

"Stereolithography" (SLA) refers to a process wherein a liquid polymer is locally solidified by photo-initiated cross-linking. In the process, light is focused onto the surface of a container of uncured photopolymer, and the desired 2D cross-sectional shape is 'drawn,' producing a solidified 2D pattern. Repeating this process produces 3D geometries of the desired shape.

"Laminated Object Manufacturing" (LOM) means the use of thin layers cut to shape and joined together (e.g., paper, polymer, metal) to form a desired three-dimensional workpiece.

"Vat Photopolymerization" refers to the use of liquid polymer resin which is held in a vat and wherein an ultraviolet light cures the resin one layer at a time leaving a 3D object.

"Binder jetting" refers to the use of a powered-based material spread onto a platform with a roller. A print head then deposits an adhesive binder onto the powered and/or energy may be imparted on the layer to cause adhesion of a binder present in the powder-based material the process is repeated according to the desired 3D geometry of a desired shape. For metal based powders the final 3D shape may be sintered to form a desired metal alloy and microstructure.

"Directed Energy Deposition" means depositing layers on a fixed 3D object by moving the nozzle around the object to deposit layers and build up a desired 3D shape. The deposited material is then melted or sintered with a laser or similar energy source (electron beam, plasma arc, etc.)

Figure 1C:
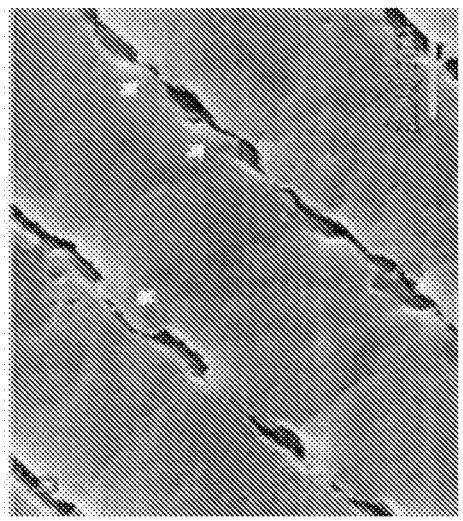
FIGS. 1A-1C show examples of topological optimization in nature.
Figure 1B:
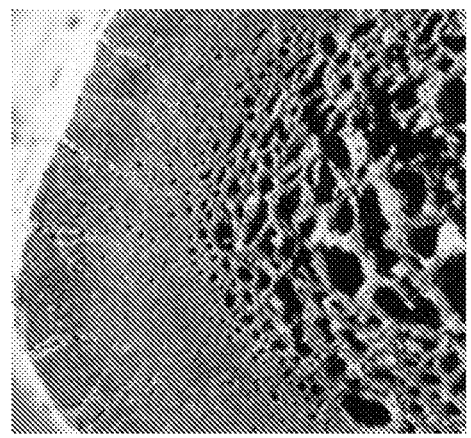
Figure 1A:
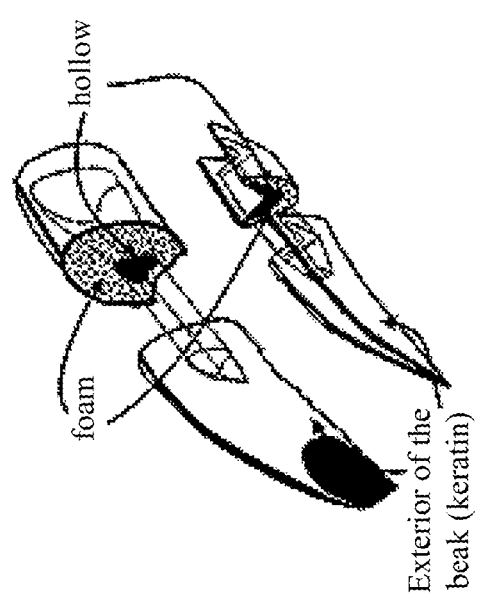
Figure 2A:
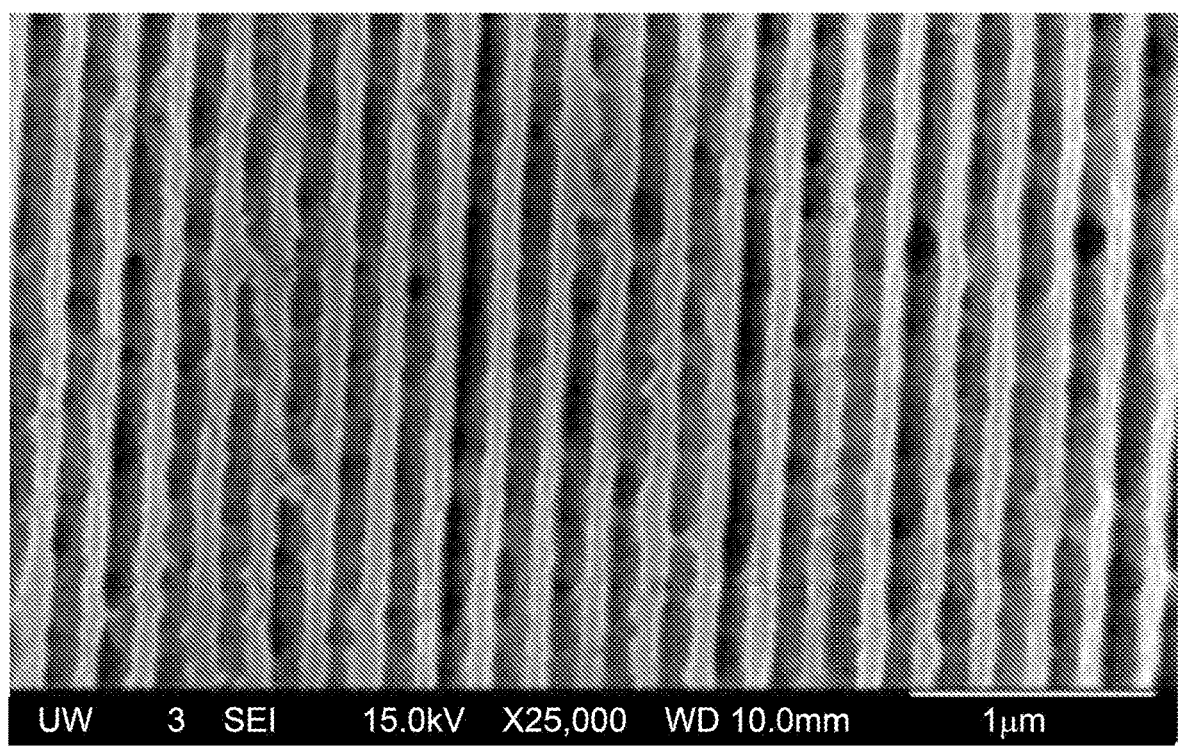
FIG. 2A shows a scanning electron micrograph (SEM) of a nanolaminated structure with a scale bar of 1 micrometer.
Figure 2B:
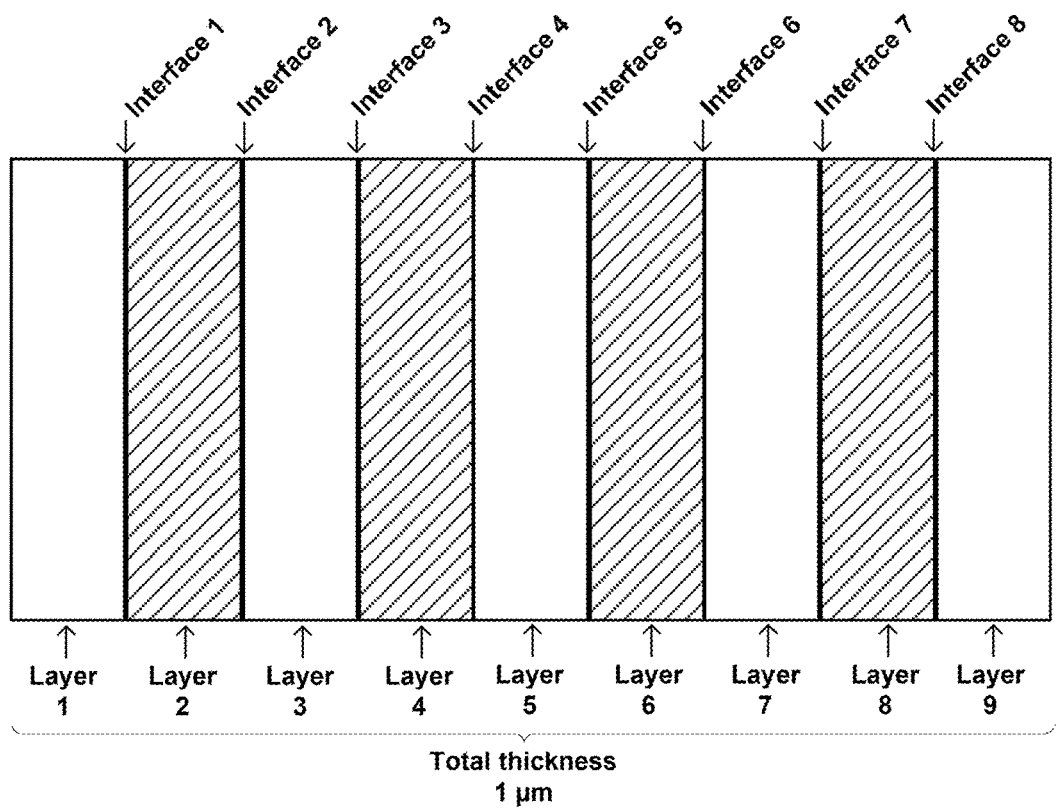
FIG. 2B illustrates a laminate material to demonstrate calculation of interface density.

"Interface density" is the number of layer interfaces over a collective (i.e., total) thickness of the layers. "Interfaces" as used herein refers to interfaces between laminated layers. For purposes of this disclosure, interface does not refer to an interface between the laminate material and the workpiece and/or the laminate material's interface with the environment (i.e., the laminate material surface). A laminated material having a number of layers (L) would have L−1 interfaces between layers through a total thickness (T) of the layers. A laminate material has an interface density of (L−1)/T. For example, as shown in FIG. 2B, the laminate material has nine layers (L=9) and a total thickness of 1 µm. Therefore, in this example, the laminate material has an interface density of 8 interfaces/µm.

"High interface packing" (HIP) material refers to a laminate material having a high density of layer interfaces per unit of thickness. In some embodiments, such a laminate material is a nanolaminate material. A laminate material with HIP may have an interface density greater than 2, 3, 4, 5, 10, 20, 50, 100, 200, 300, 400, or 500 layer interfaces per micrometer. In some embodiments, interface density is calculated over the full thickness of the laminate material. In other embodiments, interface density is calculated over a partial thickness of a laminate material. In such embodiments, a partial thickness of the laminate material may include, for example, 5, 10, 20, 40, 50, or more layers.

"Engineered Structural Materials" (ESM) are a subset of HIP materials in which laminate materials with a high density of layer interfaces are applied onto non-structural porous materials including density-graded structures and lattice structures. Such non-structural materials are thus reinforced by the ESM. In such embodiments, the unmodified non-structural materials may have less than 25% of the strength, hardness, and/or toughness as compared to the article produced. In some embodiments, the unmodified non-structural materials may have less than 10% of the strength, hardness, and/or toughness as compared to the article produced. In further embodiments, the unmodified non-structural materials may have less than 5% of the strength, hardness, and/or toughness as compared to the article produced.

"Laminate materials" include thin layers that are electrodeposited onto a surface of a workpiece. Therefore "laminate materials," as used herein, includes claddings, which are made of a series of thin electrodeposited layers on a surface of a mandrel, where the mandrel is removed after formation of the electrodeposited layers. Claddings are generally fastened to another article as a protective layer after formation.

"Laminated," or "laminate" as used herein, refers to materials that comprise two or more layers. In some embodiments, a laminate material comprises at least three, at least four, at least five, at least 10, at least 20, at least 50, or at least 100 layers. In embodiments, laminate or laminated refers to materials made up of a series of layers in an alternating or non-alternating pattern. Alternating layers may comprise two types of layers (e.g., A, B, A, B, A, B . . . ), three types of layers (e.g., A, B, C, A, B, C, A, B, C . . . ), four types of layers (e.g., A, B, C, D, A, B, C, D . . . ), or more types of layers. Non-alternating layers may comprise three or more different types of layers. In some embodiments, non-alternating layers comprise four or more different types of layers. Laminated, as used herein includes nanolaminated.

"Nanolaminate" or "nanolaminated," within the meaning of this disclosure are laminate materials comprising two or more layers in which each of the individual layers has a thickness of less than about 1,000 nanometers (i.e., 1 µm). In other words, the term "nanolaminated" in "nanolaminated materials" in this disclosure refers to the thickness of the layers in the laminate material, not the overall thickness of the laminate material made up of the individual layers. In embodiments, "nanolaminated" refers to materials that comprise, consist essentially of, or consist of, a series of laminated layers each having a thickness of less than 0.5 µm. The processes described herein are particularly suited for providing nanolaminated materials; however, they certainly also can be used to make articles in which the individual layers that are thicker than 1 µm. In some embodiments, a nanolaminate material comprises at least three, at least four, at least five, at least 10, at least 20, at least 50, or at least 100 layers.

"Balance" or "balance of the composition," as used herein in reference to the composition of materials, refers to the portion of the composition not defined by an explicit amount or range, or, in other words, the remainder of the composition.

"Electrodeposition" or "electrodeposited" refers to a process or a resultant product, respectively, in which electrolysis is used to deposit a laminate material onto a workpiece. In other words, a workpiece is contacted with (e.g., partially immersed in, or fully immersed in) an electrolyte solution containing one or more ions (e.g., metal, ceramic, etc.) while an electric current is passed through the workpiece and the electrolyte solution, resulting in a thin layer being deposited on the surface of the workpiece.

The term "wavelength" refers to the thickness of two adjacent layers that are formed in a single deposition cycle in embodiments where the current density is a periodic function.

"Electroless plating" means autocatalytic plating in which the plating bath contains reducing agents ready to react with the workpiece, and the catalyst is the metal to be deposited on the surface of a workpiece placed in the plating bath.

"Electrolyte," as used herein, means an electrolyte bath, plating bath, or electroplating solution from which one or more metals may be electroplated.

An "article" describes a finished product of a workpiece that has been coated by a method as described herein. Therefore, an article is a workpiece with a laminate, nano-laminate, or microlaminate material on a surface. In some examples, an article is a cladding after the mandrel has been removed.

"ASTM" means the American Society for Testing and Materials, headquartered in West Conshohocken, Pennsylvania. The ASTM standards referred to herein are the most recent standards promulgated by the ASTM at the time the earliest member of the patent family was filed, unless indicated otherwise, such as by stating the date and/or version of the standard.

All compositions given as percentages are given as percent by weight unless stated otherwise.

The term "about" has the meaning reasonably ascribed to it by a person of ordinary skill in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

The term "substantially" has the meaning reasonably ascribed to it by a person of ordinary skill in the art when used to describe a physical characteristic of an item, i.e., indicating that the item possesses the referenced characteristic to a significant extent, e.g., to within a range of ±20% of the referenced characteristic; ±19% of the referenced characteristic; ±18% of the referenced characteristic; ±17% of the referenced characteristic; ±16% of the referenced characteristic; ±15% of the referenced characteristic; ±14% of the referenced characteristic; ±13% of the referenced characteristic; ±12% of the referenced characteristic; ±11% of the referenced characteristic; ±10% of the referenced characteristic; ±9% of the referenced characteristic; ±8% of the referenced characteristic; ±7% of the referenced characteristic; ±6% of the referenced characteristic; ±5% of the referenced characteristic; ±4% of the referenced characteristic; ±3% of the referenced characteristic; ±2% of the referenced characteristic; or ±1% of the referenced characteristic. For example, an item may be considered substantially circular if any two measurements of a diameter of the item are within a range of ±20%, ±19%; ±18%; ±17%; ±16%; ±15%; ±14%; ±13%; ±12%; ±11%; ±10%; ±9%; ±8%; ±7%; ±6%; ±5%; ±4%; ±3%; ±2%; or ±1% of each other. When used in conjunction with a comparator (e.g., "a first laminate material is substantially thicker than a second laminate material") substantially is used to mean that the difference is at least ±20% of the referenced characteristic; ±19% of the referenced characteristic; ±18% of the referenced characteristic; ±17% of the referenced characteristic; ±16% of the referenced characteristic; ±15% of the referenced characteristic; ±14% of the referenced characteristic; ±13% of the referenced characteristic; ±12% of the referenced characteristic; ±11% of the referenced characteristic; ±10% of the referenced characteristic; ±9% of the referenced characteristic; ±8% of the referenced characteristic; ±7% of the referenced characteristic; ±6% of the referenced characteristic; ±5% of the referenced characteristic; ±4% of the referenced characteristic; ±3% of the referenced characteristic; ±2% of the referenced characteristic; or ±1% of the referenced characteristic.

In some embodiments, "substantially uniform thickness," as used herein means an overall thickness variation of less than ±30% from the average thickness. Stricter tolerances may be specified, including variations of less than ±25%, ±20%, ±15%, ±10%, or ±5% from the average surface thickness.

The terms "a," "an," "the," and similar articles or terms used in the context of describing the disclosure (especially in the context of the following claims) are to be construed to cover both the singular and the plural (i.e., "one or more"), unless otherwise indicated herein or clearly contradicted by context. Ranges of values recited herein are intended to serve as a shorthand method of referring individually to each separate value falling within the range. In the present description, any concentration range, percentage range, ratio range, or integer range is to be understood to include the value of any integer within the recited range and, when appropriate, fractions thereof (such as one tenth and one hundredth of an integer), unless otherwise indicated. Also, any number range recited herein relating to any physical feature, such as size or thickness, are to be understood to include any integer within the recited range, unless otherwise indicated. Unless otherwise indicated herein, each individual value is incorporated into the specification as if it were individually recited herein.

The use of the alternative (e.g., "or") should be understood to mean one, both, or any combination thereof of the alternatives. The various embodiments described above can be combined to provide further embodiments. Groupings of alternative elements or embodiments of the disclosure described herein should not be construed as limitations. Each member of a group may be referred to and claimed individually, or in any combination with other members of the group or other elements found herein.

Each embodiment disclosed herein can comprise, consist essentially of, or consist of a particular stated element, step, ingredient, or component. The term "comprise" or "comprises" means "includes, but is not limited to," and allows for the inclusion of unspecified elements, steps, ingredients, or components, even in major amounts. The phrase "consisting of" excludes any element, step, ingredient, or component that is not specified. The phrase "consisting essentially of" limits the scope of the embodiment to the specified elements, steps, ingredients, or components, and to those that do not materially affect the basic and novel characteristics of the claimed disclosure.

Articles

As noted above, the present disclosure provides for articles comprising HIP materials. In embodiments, the HIP materials are engineered structural materials (ESM).

In embodiments, a HIP material has an interface density of at least 2.0 interfaces/micrometer ($\mu$m). In some embodiments, a HIP material has an interface density of at least about 5 interfaces/$\mu$m. In some embodiments, a HIP material has an interface density of at least about 10 interfaces/$\mu$m. In some embodiments, a HIP material has an interface density of at least about 20 interfaces/$\mu$m. In some embodiments, a HIP material has an interface density of at least about 50 interfaces/$\mu$m. In some embodiments, a HIP material has an interface density of at least about 100 interfaces/$\mu$m. In some embodiments, a HIP material has an interface density of at least about 200 interfaces/$\mu$m. In some embodiments, a HIP material has an interface density of at least about 300 interfaces/$\mu$m. In some embodiments, a HIP material has an interface density of at least about 400 interfaces/$\mu$m. In some embodiments, a HIP material has an interface density of at least about 500 interfaces/$\mu$m. In some embodiments, a HIP material has an interface density of at least about 600 interfaces/$\mu$m. In some embodiments, a HIP material has an interface density of at least about 750 interfaces/$\mu$m.

In embodiments, a HIP material has an interface density ranging from about 5 interfaces/$\mu$m to about 2,000 interfaces/$\mu$m. In some embodiments, a HIP material has an interface density ranging from about 10 interfaces/$\mu$m to about 1,000 interfaces/$\mu$m. In some embodiments, a HIP material has an interface density ranging from about 20 interfaces/$\mu$m to about 750 interfaces/$\mu$m. In some embodiments, a HIP material has an interface density ranging from about 50 interfaces/$\mu$m to about 500 interfaces/$\mu$m. In some embodiments, a HIP material has an interface density ranging from about 100 interfaces/$\mu$m to about 2,000 interfaces/$\mu$m. In some embodiments, a HIP material has an interface density ranging from about 500 interfaces/$\mu$m to about 1,000 interfaces/$\mu$m. In some embodiments, a HIP material has an interface density ranging from about 400 interfaces/$\mu$m to about 1,500 interfaces/$\mu$m.

HIP materials of the present disclosure include a plurality of layers that repeat in a pattern. In some embodiments, a plurality of layers is made up of two layers that alternate. In further embodiments, HIP materials include a plurality of alternating first and second layers. In embodiments, a HIP material comprises first layers having a first composition and second layers having a second composition. In such embodiments, the first layers and the second layers differ in at least one of grain size, defect density, grain orientation, presence of intermetallic compositions, presence of amorphous metallic glass content, or a combination thereof. In further embodiments, such a HIP material comprises alternating first layers and second layers.

In embodiments, the first layers independently have an average grain size ranging from about 1 nm to 1,000 nm based on a grain size measurement in micrographs. In some embodiments, the second layers independently have an average grain size ranging from about 1,000 nm to 5,000 nm based on a grain size measurement in micrographs. In particular embodiments, the first layers and the second layers have a high degree of twinning, and the HIP material has an increase in hardness, tensile strength, corrosion resistance, or a combination thereof relative to an electrodeposited metal or alloy having the same average composition with a grain size of at least 5,000 nm.

Alternatively, one or more additional layers may be present in HIP materials between any first and second layer. In other embodiments, a plurality of layers is made up of more than two layers that repeat in any suitable pattern (e.g., A-B-C-A-B-C-A-B-C or A-B-C-B-A-B-C). In addition, the thickness of each of the plurality of layers may repeat in any suitable pattern.

Each layer of a HIP material may comprise a metal, a metal alloy, or a ceramic. In embodiments, each layer of a HIP material independently includes at least one electrodepositable species independently selected from silver (Ag), aluminum (Al), gold (Au), boron (B), beryllium (Be), carbon (C), cobalt (Co), chromium (Cr), copper (Cu), iron (Fe), mercury (Hg), indium (In), iridium (Ir), magnesium (Mg), manganese (Mn), molybdenum (Mo), niobium (Nb), neodymium (Nd), nickel (Ni), phosphorous (P), palladium (Pd), platinum (Pt), rhenium (Re), rhodium (Rh), antimony (Sb), silicon (Si), tin (Sn), lead (Pb), tantalum (Ta), titanium (Ti), tungsten (W), vanadium (V), zinc (Zn), and zirconium (Zr). In some embodiments, each layer of a HIP material independently includes at least 0.01% (w/w) of Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, or Zr. Each electrodepositable species may be present in a layer of a HIP material in a concentration of about 0.1%, about 0.05%, about 0.01%, about 0.005%, or about 0.001% by weight.

Figures 5A, 5B, 5C:
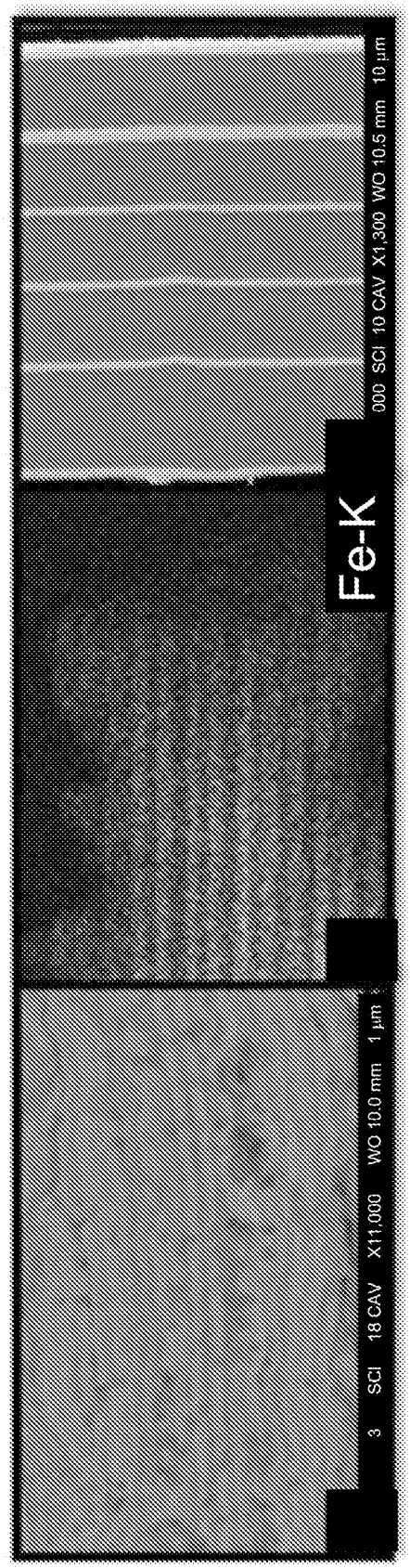
FIGS. 5A-5C show examples of HIP materials.

In embodiments, a HIP material is a metal laminate material (e.g., nanolaminate material). In some embodiments, metal laminate materials offer a variety of advantages for HIP materials, including ESM. Metal nanolaminates have been shown to exhibit high strain-rate yield and tensile strengths that are well in excess (3-6 times) of those of post-treated, homogeneous materials of similar composition, without loss of ductility. Laminate materials (e.g., nanolaminate HIP materials), when designed to have a high interface-to-volume ratio as well as chemically and morphologically stable interfaces, can possess ultra-high strengths, high resistance to fatigue damage, and tolerance to irradiation damage. Studies involving these types of laminate materials (e.g., nanolaminate HIP materials) have demonstrated superior performance in impact toughness, wear resistance, damping, hardness, stiffness and other properties that are critical in the design of structural materials in particular. By leveraging phenomena that occur in laminate materials (i.e., non-homogeneous laminate materials; see, e.g., FIGS. 5A-5C), HIP materials (e.g., ESM) having increased structural, corrosion, and high temperature performance are available.

In certain embodiments, first and second layers of a HIP material collectively comprise Al and Si. In some embodiments, first and second layers of a HIP material collectively comprise Cu and Nb. In further embodiments, first and second layers of a HIP material collectively comprise Cu and Ni. In particular embodiments, first and second layers of a HIP material collectively comprise Ni and Fe. In some embodiments, first and second layers of a HIP material collectively comprise Al and Fe. In further embodiments, first and second layers of a HIP material collectively comprise Ni and Al.

In embodiments, a HIP material comprises AlZn, AlSi, CuNb, CuNi, NiFe, AlFe, NiAl, NiCr, NiCo, NiCrCo, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiNb, NiCrNb, NiFeNb, NiCoNb, NiCrCoNb, NiTi, NiCrTi, NiFeTi, NiCoTi, NiCrCoTi, NiCrP, NiCoP, NiFeP, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, or FeCrB. In some embodiments, a HIP material comprises CuNbNi.

Each layer independently has a thickness in a range selected independently from about 0.5 nm to about 2,000 nm. In embodiments, each layer independently has a thickness in a range selected independently from about 1 nm to about 1,500 nm. In some embodiments, each layer independently has a thickness in a range selected independently from about 1 nm to about 1,000 nm. In further embodiments, each layer independently has a thickness in a range selected independently from about 2 nm to about 100 nm. In still further embodiments, each layer independently has a thickness in a range selected independently from about 5 nm to about 70 nm. In yet further embodiments, each layer independently has a thickness in a range selected independently from about 0.5 nm to about 50 nm. In certain embodiments, each layer independently has a thickness in a range independently from about 1 nm to about 20 nm.

In embodiments, a HIP material is a nanolaminate HIP material.

An interface between individual layers may be discrete or diffuse. An interface between the neighboring layers is considered to be "discrete" if the composition shifts between a first layer and a second layer over a distance that is less than about 20% of a thickness of the thinner of the two layers. In embodiments, an interface between neighboring layers is considered to be discrete if the composition shifts between a first layer and a second layer over a distance that is less than about 15% of a thickness of the thinner of the layers. In some embodiments, an interface between neighboring layers is considered to be discrete if the composition shifts between a first layer and a second layer over a distance that is less than about 10% of a thickness of the thinner of the layers. In further embodiments, an interface between neighboring layers is considered to be discrete if the composition shifts between a first layer and a second layer over a distance that is less than about 5% of a thickness of the thinner of the layers. In other embodiments, an interface between neighboring layers is considered to be discrete if the composition shifts between a first layer and a second layer over a distance that is less than about 2% of a thickness of the thinner of the layers.

In embodiments, an interface is "diffuse" if the composition shifts between a first layer and a second layer over a more than about 20% of the thickness of a thinner of the two layers. In embodiments, an interface between neighboring layers is considered to be diffuse if the composition shifts between a first layer and a second layer over a distance that is more than about 15% of a thickness of the thinner of the layers. In some embodiments, an interface between neighboring layers is considered to be diffuse if the composition shifts between a first layer and a second layer over a distance that is more than about 10% of a thickness of the thinner of the layers. In further embodiments, an interface between neighboring layers is considered to be diffuse if the composition shifts between a first layer and a second layer over a distance that is more than about 5% of a thickness of the thinner of the layers. In additional embodiments, an interface between neighboring layers is considered to be diffuse if the composition shifts between a first layer and a second layer over a distance that is more than about 2% of a thickness of the thinner of the layers.

In embodiments, a diffuse interface has a composition shift between a first layer and a second layer over a thickness in a range of about 0.5 nm to about 5 nm. In some embodiments, a diffuse interface has a thickness in a range of about 0.5 nm to about 3 nm. In further embodiments, a diffuse interface has a thickness in a range from about 0.5 nm to about 1 nm, from about 1 nm to about 2 nm, or from about 2 nm to about 3 nm.

The interfaces of bimetallic nanolaminate materials with discrete layers generally have either coherent or incoherent interfaces. The differences in the interactions at those interfaces can be seen, for example, in the interaction between face centered cube (FCC) and body centered cube (bcc) systems. For example, the face centered cube (FCC) FCC/FCC CuNi systems with cube-on-cube orientation have a coherent interface where the atomic arrangement and slip systems are continuous across the interface, while the FCC/BCC CuNb system with a Kurdjumov-Sachs orientation have an incoherent interface where the slip system is not continuous.

It is generally understood that coherent systems are more ductile and their increased strength is determined to a large extent by the ability of the interfaces to act as barriers to dislocation transmission between layers. Hoagland, R. G., T. E. Mitchell, J. P. Hirth, and H. Kung, *On the strengthening effects of interfaces in multilayer fcc metallic composites*, 82(4) Philosophical Magazine A, 643-664, 2002. Incoherent interfaces are generally stronger; they act as barriers to slip transmission, are weak in shear, and act as dislocation sinks, resulting in the shearing of the interface.

An overall thickness of a HIP material may vary widely in different locations in the article. In some embodiments, a HIP material has a substantially uniform thickness. In other embodiments, a thickness of a HIP material varies in at least one dimension. In such embodiments, a thickness of a HIP material may vary through the depth of the article. In some embodiments where the HIP material has a lattice structure, a thickness of a HIP material varies through a depth of the lattice structure.

HIP materials as described herein may include a large number of layers. Such HIP materials may include at least five layers. In embodiments, HIP materials include at least ten layers. In some embodiments, HIP materials include at least 20 layers. In further embodiments, HIP materials include at least 50 layers. In still further embodiments, HIP materials include at least 100 layers. In yet further embodiments, HIP materials include at least 200 layers. In even further embodiments, HIP materials include at least 500 layers.

Each HIP material has a surface layer, which is the layer that is in contact with the outside environment. In embodiments, a surface layer has a density (i.e., percent surface area coverage if the workpiece is treated as a geometric solid) of at least 60%. In some embodiments, a surface layer has a density of at least 75%. In further embodiments, a surface layer has a density of at least 80%. In still further embodiments, a surface layer has a density of at least 90%. In yet further embodiments, a surface layer has a density of at least 95%. In additional embodiments, a surface layer has a density of at least 99%. In further embodiments, a surface layer is fully dense. Where the surface layer is fully dense the laminate material completely encapsulates the workpiece.

Generally, an article comprising a HIP material of the present disclosure is prepared by depositing the HIP material on a surface of a workpiece. In some embodiments, a workpiece is present in the final article. In other embodiments, a workpiece has been removed during the preparation of the final article.

A variety of workpieces may be utilized to prepare an article of the disclosure, including porous materials (e.g., foams). In some embodiments, a workpiece is an open cell porous material.

A workpiece, and the resulting HIP material, may have a void volume of at least 40%. In embodiments, a workpiece, and the resulting HIP material, has a void volume of at least 50%. In some embodiments, a workpiece, and the resulting HIP material, has a void volume of at least 60%. In other embodiments, a workpiece, and the resulting HIP material, has a void volume of at least 70%. In further embodiments, a workpiece, and the resulting HIP material, has a void volume of at least 80%. In still further embodiments, a workpiece, and the resulting HIP material, has a void volume of at least 90%. In additional embodiments, a workpiece, and the resulting HIP material, has a void volume of at least 95%. In even further embodiments, a workpiece, and the resulting HIP material, has a void volume of at least 97%. In yet further embodiments, a workpiece, and the resulting HIP material, has a void volume of at least 99%.

Accordingly, embodiments of the present disclosure include an article comprising a laminate material having a void volume of at least 40%, the laminate material having an interface density of at least 2.0 layers/μm.

Figure 4:
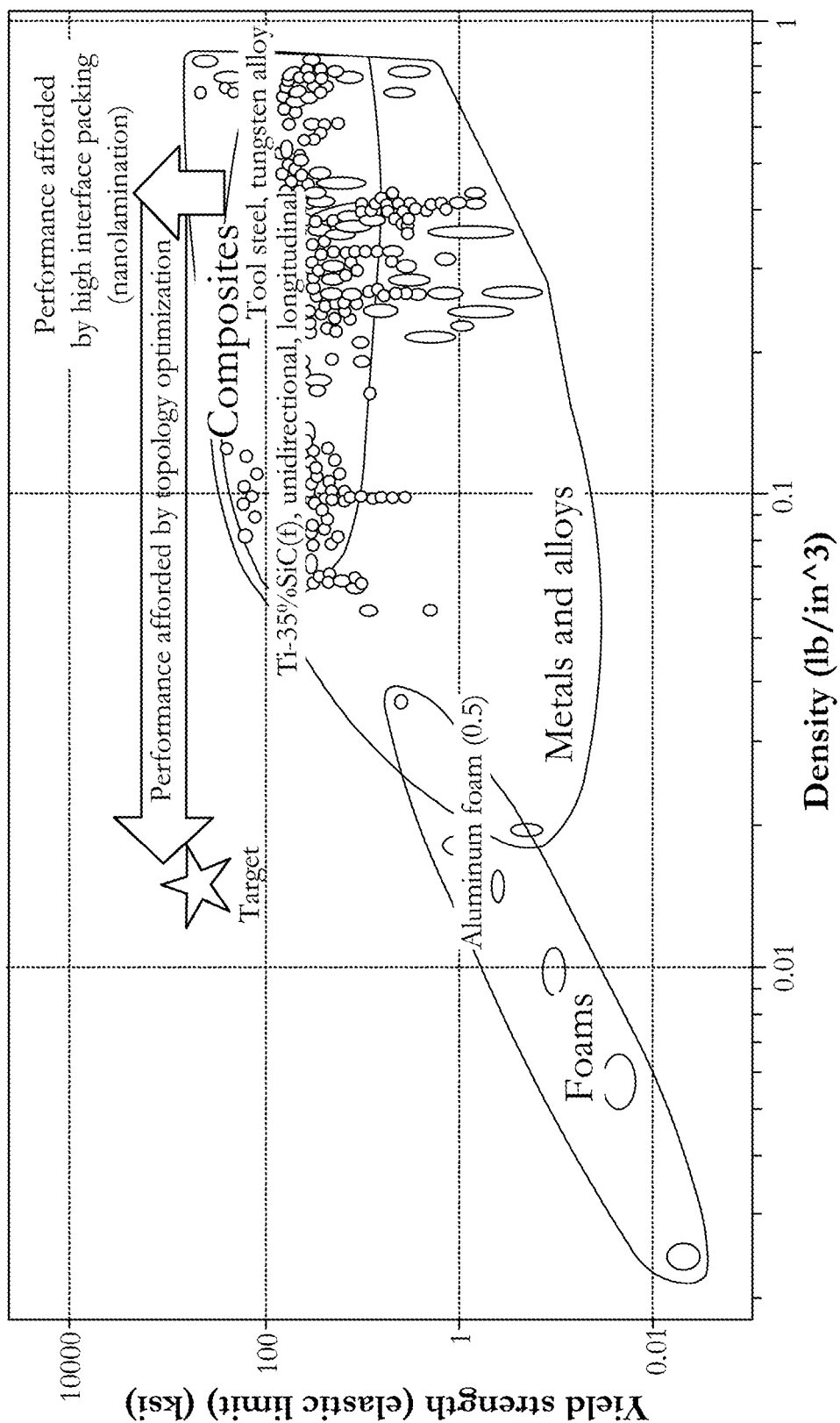
FIG. 4 illustrates the relationship between architectural control and performance objectives.

In embodiments, a workpiece, and the resulting HIP material, has a lattice structure comprising a plurality of interconnected struts forming polyhedrons in a series that extends in three dimensions. In some embodiments, workpieces comprise a series of open polyhedrons formed by a series of struts extending between the adjacent vertices of the polyhedrons. The combined influence of the laminate material and lattice structure properties on ESM is illustrated in the Ashby Chart overlay in FIG. 4.

Therefore, embodiments of the present disclosure include an article comprising a laminate material having a lattice structure comprising a plurality of interconnected struts forming polyhedrons in a series that extends in three dimensions, the laminate material having an interface density of at least 2.0 layers/μm.

The plurality of interconnected struts of a lattice structure may have an average length ranging from about 0.5 μm to about 10 millimeters (mm). In some embodiments, a plurality of interconnected struts of a lattice structure has an average length ranging from about 1 µm to about 500 µm. In further embodiments, a plurality of interconnected struts of a lattice structure has an average length ranging from about 0.5 mm to about 5.0 mm.

In some embodiments, the plurality of interconnected struts of a lattice structure has an average length ranging from about 1 µm to about 10 mm, about 1 µm to about 500 µm, about 10 µm to about 100 µm, about 10 µm to about 500 µm, about 20 µm to about 200 µm, about 20 µm to about 500 µm, about 50 µm to about 300 µm, about 50 µm to about 500 µm, about 0.5 mm to about 1.0 mm, about 0.5 mm to about 5.0 mm, about 1.0 mm to about 5.0 mm, about 0.2 mm to about 2.0 mm, about 0.2 mm to about 5.0 mm, or about 5.0 mm to about 10.0 mm. In further embodiments, the plurality of interconnected struts has an average length ranging from 1 µm to about 500 µm, about 10 µm to about 100 µm, about 10 µm to about 200 µm, about 10 µm to about 500 µm, about 20 µm to about 200 µm, about 20 µm to about 500 µm, about 50 µm to about 300 µm, about 50 µm to about 500 µm, about 75 µm to about 250 µm, about 75 µm to about 500 µm, about 100 µm to about 300 µm, or about 100 µm to about 500 µm.

A thickness of a plurality of interconnected struts of a lattice structure may vary in at least one dimension. In some embodiments, a thickness of a plurality of interconnected struts of a lattice structure varies through a depth of a lattice structure.

In embodiments, the plurality of interconnected struts is hollow. In such embodiments, a thickness of a wall of the plurality of interconnected struts may vary in at least one dimension. In some embodiments, a thickness of a wall of a plurality of interconnected struts varies through a depth of a lattice structure.

A series of polyhedrons may comprise tetrahedrons, octahedrons, cubes, cuboctahedrons, icosahedrons, dodecahedrons, square pyramids, prisms (trigonal, rectangular, pentagonal, hexagonal, etc.), or a combination thereof.

In embodiments, a series of polyhedrons comprises substantially identical polyhedrons. In other embodiments, a series of polyhedrons comprise two or more different types of polyhedrons. In embodiments, at least one polyhedron is regular. In some embodiments, a majority of the polyhedrons is regular. In further embodiments, the polyhedrons are regular. In embodiments, at least one polyhedron is irregular. In some embodiments, a majority of the polyhedrons is irregular. In further embodiments, the polyhedrons are irregular.

A series of polyhedrons may comprise uniform polyhedrons, such as tetrahedrons, octahedrons, cubes, cuboctahedrons, icosahedrons, dodecahedrons, or a combination thereof. Regular uniform polygons that may be employed include tetrahedrons, octahedrons, icosahedrons, or a combination thereof. In some embodiments, a series of polyhedrons comprises non-uniform polyhedrons, such as square pyramids, prisms (trigonal, rectangular, pentagonal, hexagonal, etc.), or a combination thereof.

In embodiments, at least one polyhedron is triangulated. In some embodiments, a majority of the polyhedrons is triangulated. In some embodiments the majority of the series of polyhedrons comprises, consists essentially of, or consists of triangulated polyhedrons. "Consists essentially of" in this context means that more than half of the series of polyhedrons of the workpiece comprises the specified element. In further embodiments, the polyhedrons are triangulated. In certain embodiments, a triangulated polyhedron is a tetrahedron, an octahedron, or an icosahedron. In embodiments, the majority of the polyhedrons comprises, consists essentially of, or consists of, tetrahedrons, octahedrons, icosahedrons, or a combination thereof. In other embodiments, the majority of the polyhedrons comprises, consists essentially of, or consists of tetrahedrons. In further embodiments, the majority of the polyhedrons comprises, consists essentially of, or consists of octahedrons. In still further embodiments, the majority of the polyhedrons comprises, consists essentially of, or consists of icosahedrons.

In embodiments, all of the polyhedrons comprise, consist essentially of, or consist of, tetrahedrons, octahedrons, icosahedrons, or a combination thereof. In other embodiments, all of the polyhedrons comprise, consist essentially of, or consist of tetrahedrons. In further embodiments, all of the polyhedrons comprise, consist essentially of, or consist of octahedrons. In still further embodiments, all of the polyhedrons comprise, consist essentially of, or consist of icosahedrons.

A series of such polyhedrons may comprise at least 100 polyhedrons. In some embodiments, a series of polyhedrons comprises at least 500 polyhedrons. In further embodiments, a series of polyhedrons comprises at least 1,000. In still further embodiments, a series of polyhedrons comprises at least 10,000. In yet further embodiments, a series of polyhedrons comprises at least 100,000. Such a series of polyhedrons may be arranged in at least two planes. In embodiments, a series of polyhedrons are arranged in three or more planes. In some embodiments, a series of polyhedrons are arranged in four or more planes. In further embodiments, a series of polyhedrons are arranged in five or more planes. In still further embodiments, a series of polyhedrons are arranged in ten or more planes.

Polyhedrons of a series of polyhedrons may vary in size in at least one dimension. In some embodiments, a size of the polyhedrons varies through a depth of the lattice structure.

In some embodiments, a workpiece further comprises non-polyhedral elements, such as spherical elements, cylindrical elements, or both. In further embodiments, a workpiece comprises an irregularly shaped element. Such embodiments may arise when an article is prepared for use as a portion of a device.

In embodiments, a workpiece is an open cell foam. In some embodiments, a cell size of an open cell foam varies in at least one dimension. In certain embodiments, a cell size of an open cell foam varies through a depth of the workpiece. In some embodiments, a cell size of an open cell foam decreases from the outer surface toward the center of the workpiece and increases from a central area of the workpiece toward an opposite outer surface. In such embodiments, a workpiece may comprise a hollow cavity surrounded by the plurality of polyhedrons and the interconnected struts.

In some embodiments, the density of the workpiece is graded. Workpieces may have a density gradient such that, in the absence of HIP materials, the amount of space unoccupied by the workpiece increases or decreases in at least one dimension. In other words, the amount of void space, prior to application of the HIP material, varies in at least one dimension. Examples of workpieces with graded density include foam workpieces (e.g., an open cell foam) having continuously increasing cell size across a thickness; workpieces formed from a series of laminated layers of foam; lattice structures with repeating unit cells (e.g., hollow polyhedral metal or polymer lattices having struts along the edges of the polyhedrons) having variable strut thickness with a corresponding change in the void space within the lattices; workpieces formed from porous materials having one or more repeating polyhedrons, which may vary in overall dimensions and in the thickness of the lattice elements themselves; or a combination thereof.

In some embodiments, the workpiece topology is graded by layering a series of increasingly dense foam layers. In other embodiments, the workpiece is layered by having increasing amounts of void space across its thickness (e.g., foam having layers that continuously vary in cell size). In yet other embodiments, a workpiece has a hollow or partially hollow lattice structure formed along the edges of one or more regular and/or repeated polyhedral elements from struts intersecting at the vertices.

Workpiece density gradients may increase or decrease monotonically across a thickness of the workpiece, or may reach a maximum or minimum within the workpiece (e.g., increase in density to a point then decrease in density across a thickness of the workpiece), or have multiple local density maxima and/or minima across a thickness of a workpiece.

In addition to gradients in workpiece density across the thickness of the workpiece, there may be gradients in HIP material applied to the workpiece. As such, HIP materials applied to workpieces may also be graded (e.g., from the layer closest to the workpieces (first applied) to the outermost layer (last applied)). Gradients in the HIP material may vary in layer thickness, layer composition, defect density, grain size, or a combination thereof (see, e.g., FIG. 10B and FIG. 10C).

As with the underlying workpieces upon which the HIP materials are applied, the gradients may increase or decrease monotonically across the thickness of the HIP material or may have one or more local maximum or minimum in any of layer thickness, layer composition, defect density, grain size, or a combination thereof. It will be understood that the HIP material need not vary, but instead may have consistent characteristics across the thickness.

Topology of HIP materials can be controlled at a number of levels. By forming workpieces designed to localize HIP materials to specific locations and in specific forms in 3D space, overall 3D control of HIP material may be obtained. In addition, embodiments employing electrochemical processes to produce HIP materials possess high throwing power and allow non-line of sight electrodeposition, which permit deposition on complex geometric surfaces in 3D space. In addition to being able to produce articles having density graded (i.e., topology-optimized) structures in which the HIP material is of substantially the same thickness (i.e., substantially uniform thickness) throughout the structure, variation in the thickness of the HIP material (e.g., greater than 10% variation in laminate material density) can also be incorporated into the articles.

As applied to ESM, workpieces designed to localize HIP materials to specific locations and in specific forms in 3D space allows for formation of ESM by providing overall 3D control of HIP material. In some embodiments, electrochemical processes with high throwing power and allowing non-line of sight electrodeposition, which permit deposition on complex geometric surfaces in 3D space, are used to produce ESM. In additional embodiments, the ESM is of substantially the same thickness (i.e., substantially uniform thickness) throughout the structure. In other embodiments, the thickness of the ESM varies (e.g., greater than 10% variation in laminate material density).

FIG. 8 shows the progress of an electrochemical process. Panel (a) shows a first time point in the production of a HIP material produced on a foam workpiece. Panel (b) shows a cross-section of a second time point in the production of a HIP material produced on a foam workpiece. Three views of the nanolaminated metal HIP material electrodeposited on polymeric foam are shown above panels (a)-(d). Panels (c) and (d) show an exterior view and a cross section, respectively, of the final article of a HIP material produced on a foam workpiece. The embodiment of panels (c) and (d) show have a fully dense exterior layer.

The progress of the electrochemical process shown in FIG. 8 demonstrates the ability to apply nanolaminated materials on a non-structural foam lattice while controlling the layers of nanolaminate material, applied to the foam to impart structural strength, toughness, or a combination thereof. Additionally, as evidenced by the fully dense exterior layer, deposit density is controlled. In embodiments, at least a portion of the workpiece is coated with a fine-grained metal coating in place of, or in addition to, a HIP material.

In various embodiments, an article further comprises a conductive strike layer in contact with a HIP material. In some such embodiments, a conductive strike layer may further be in contact the workpiece.

Such porous materials may be combined with standard structural elements, such as solid sheets, perforated sheets (sheets having holes or apertures), tubes, etc., to prepare a workpiece that is subject to the application of HIP materials. An article of the disclosure may further comprise a sheet in contact with at least a portion of a plurality of the interconnected struts. In embodiments, an article comprises a plurality of sheets in contact with at least a portion of a plurality of the interconnected struts. In some embodiments, such a sheet is perforated. In other embodiments, such a sheet is solid. In some embodiments, such a sheet is substantially planar. In further embodiments, such a sheet has a uniform thickness. In such embodiments, a sheet may have less than 10% variation in thickness. In other embodiments, such a sheet has a non-uniform thickness. In such embodiments, a sheet may have greater than 10% variation in thickness.

In some embodiments, such a sheet comprises a material selected from the group consisting of metals, metal alloys, laminated metals, nanolaminated metals, composites, fiberglass, ceramics, natural fibers, ceramic fiber cloths, natural fiber cloths, polymeric cloths, metallic cloths, rubbers, plastics, and combinations thereof.

In embodiments, a first and a second side of a sheet are in contact with at least a portion of the interconnected struts. In some embodiments, a sheet is in contact with two or more vertices of the plurality of interconnected struts. In embodiments, a sheet is in contact with one or more of the plurality of interconnected struts along a length of a strut. In some embodiments, a sheet is in contact with two or more of the interconnected struts along a length of the two or more of the interconnected struts. In embodiments, a face of at least one polyhedron of the series of polyhedrons is substantially parallel to and in contact with a first side or a second side of the sheet.

In various embodiments, a portion of the plurality of the interconnected struts forms a right angle relative to the sheet. In some embodiments, a portion of the plurality of the interconnected struts forms an acute angle relative to the sheet.

The strength of nanolaminated composites has been attributed to the fact that these materials have extremely high interface-to-volume ratio (on the order of $10^8$ $m^2/m^3$), where threading dislocations become confined to their respective layers. Dislocation pile-ups observed at the microscale become increasingly difficult as the individual layer thickness decreases, ultimately becoming unsustainable. Under such conditions, plasticity is governed by single dislocation mechanisms, primarily based on Orowan bowing, and their specific interactions. According to the classical confined plasticity model for Orowan bowing, strength increases as ln(h)/h, where h is the layer thickness. However, this prediction underestimates measured strength in real systems.

Among the main suggested sources of discrepancy are interactions between bowing dislocations and interfacial dislocations, deposited as the "trailing arms," due to earlier dislocation bowing events. Dislocation dynamics (DD) analysis identified the strongest interaction between a bowing dislocation and orthogonal interfacial dislocations intersecting its path as that involving collinear Burgers vectors of the dislocations. Other DD analyses also reported a strengthening effect due to this interaction. Although the strength predictions due to this interaction better match the observed results, they do not provide the complete answer. Investigation of the interaction between bowing dislocations and pre-deposited interfacial dislocations on parallel planes shows that additional stress, proportional to the spacing between the planes, is needed to propagate a dislocation of the same sign as the interfacial dislocation. The above findings indicate that the strength of nanolaminate materials cannot be predicted simply based on one or a few significant processes. The sign of a dislocation refers to the direction of the Burgers vector describing the magnitude and direction of lattice distortion resulting from a dislocation in a crystal lattice.

Figure 6:
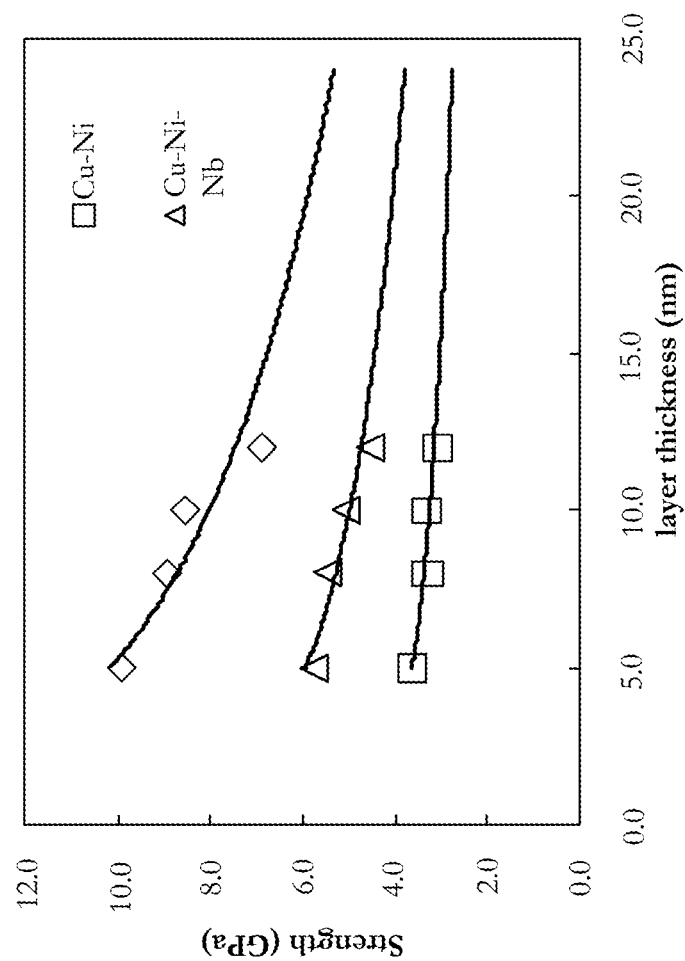
FIG. 6 illustrates strength as a function of layer thickness for three different material systems derived from atomistic simulations.

An implication of the interaction between similar dislocations on parallel interfaces is that there exists a minimum separation of dislocations in HIP materials below which dislocations cannot come closer to each other. Another critical strengthening mechanism in these HIP materials is the interaction of two interfacial dislocations of the same sign to form a Lomer dislocation, which cannot typically glide as its Burgers vector is not on a glide plane. This mechanism has a major implication on two major properties: (a) dislocation recovery, hence damage accumulation in HIP materials, and (b) texture and lattice orientation preservation, observed, for example, in Cu/Nb systems, which have undergone large plastic deformations as high as 60% reduction in thickness by rolling. These results lead to a relationship for the strength of HIP materials of the following form.

$$\sigma(h, \ell) = \alpha \frac{bE}{h^m} \ln\left(\frac{\beta h}{b}\right) + \gamma E \frac{b}{\ell} \quad (1)$$

where E is some average elastic property, b is Burgers vector, h is layer thickness, $\alpha$, $\beta$, m, $\gamma$ are material constants, and $\ell$ is the average spacing between interface and misfit dislocations. The first term in equation (1) clearly shows the strong dependence of strength on the layer thickness, and can predict the experimentally measured hardness. The analytical model is also consistent with the results from the molecular dynamics simulations summarized in FIG. 6. An important outcome of the proposed DD and MD calculations is that they lead to an optimum layer design that is verifiable through experiments. Misra, A., H. Kung, D. Hammon, R. G. Hoagland, and M. Nastasi, *Damage Mechanisms in Nanolayered Metallic Composites*, 12 International Journal of Damage Mechanics 365 (2003).

The second term on the right hand side of equation (1) is a measure of strain hardening resulting from accumulation of interfacial dislocations during deformation. That term implies that strain hardening can also significantly enhance strengthening in nanolaminate materials by as much as a factor of two. Mastorakos, I., N. Abdolrahim, and H. M. Zbib, *Deformation Mechanisms in Nano-composite Metallic Structures*, Int. 52 J. Mechanical Science 295-302 (2010).

Figure 7:
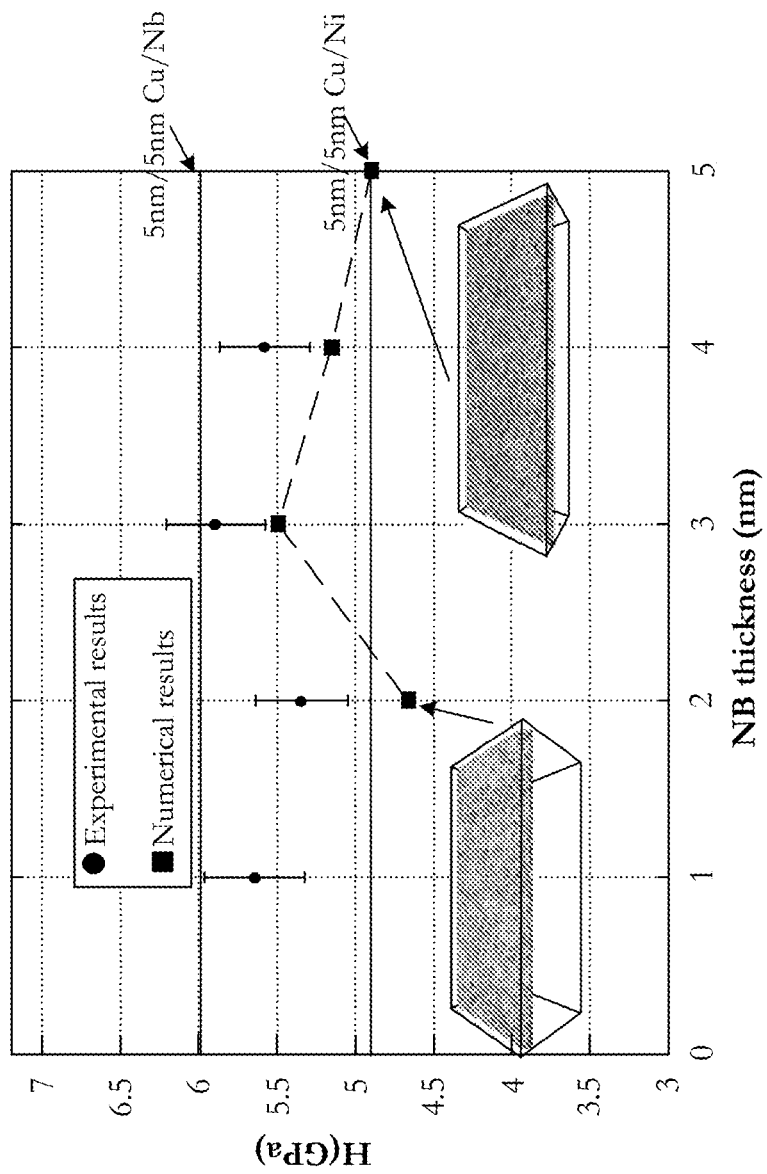
FIG. 7 illustrates strength as a function of Nb thickness. The left and right inserts show shear strain distribution in the Cu/Nb interface for 5 nm and 2 nm thicknesses, respectively. The atoms are shaded according to their shear strain with the darker shades characterizing higher shear. The thinner Nb layer shows more intense shearing. The average shear strain in the case of 2 nm is 0.3 while in the case of 5 nm it is 0.05.

Testing of multilayer HIP materials comprising trimetallic compositions (e.g., CuNbNi) with varying layer thickness using bulge testing and nanoindentation showed that trimetallic systems can be stronger than bimetallic systems (e.g., CuNi), can exhibit significant strain hardening, can display ductile behavior, and can be as strong as the CuNb system at an optimum layer design. Optimization of the configuration through modeling and empirical analysis produced a trilayer CuNiNb system with a layer thickness scheme of 3 nm/5 nm/5 nm respectively (see FIG. 7).

Accordingly, it is possible to use HIP materials with specified toughness:hardness ratios as laminate materials, for example, in ESMs and to produce high-stiffness and low density material by design.

By combining the HIP materials with porous materials, it is possible to overcome the joint deficiency noted in conventional foam core structures. When stress is applied to these HIP materials, the laminates express interleaved compressive and tensile modes that resist deformation.

Figure 3:
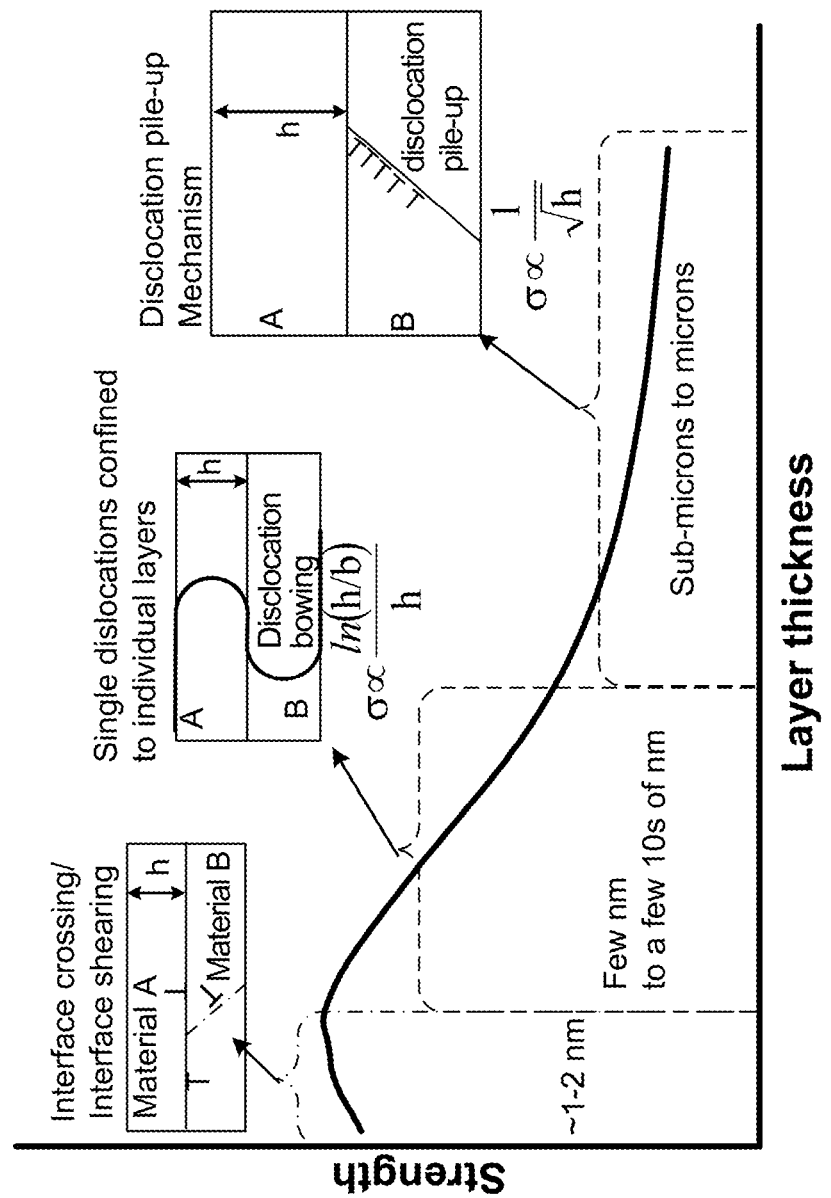
FIG. 3 shows interface modeling as a function of layer thickness.

Modeling of HIP materials, including ESM, that include electrodeposited laminate (e.g., nanolaminate) materials has identified the influence of interface interactions and scale characteristics on material performance. Among the interface interactions and scale characteristics identified as relevant to preparing the ESMs described herein are laminate/nanolaminate layer thickness, layer density, coherency and incoherence (lattice mismatch) in interfaces. The use of varying layer thicknesses provides a mechanism for property optimization of the hierarchical, laminate material structures by including layers that differ in, among other things, thickness as a means of providing controlled incorporation of interface crossing/interface shearing mechanisms, confinement of dislocations to individual layers or a subgroup of individual layers (e.g., adjacent sublayers), and mechanisms that result in dislocation pile-up. FIG. 3 illustrates those interface interaction models that, in particular, influence strength as a function of layer thickness. Toughness (energy absorption) and stiffness of the HIP materials (e.g., incorporated into ESM) may be represented in similar graphic analysis.

The use of HIP materials (e.g., nanolaminate HIP materials) applied onto 3D structures including density-graded workpieces results in HIP materials (e.g., ESM) having a combination of performance characteristics such as low weight or low density combined with strength, toughness, hardness, or a combination thereof. Such combined performance characteristics are unavailable from fully dense homogenous materials.

As shown in FIG. 8, a nanolaminated HIP material is applied onto nonstructural foams to form a stiff and tough, yet lightweight structure. In some embodiments, the workpieces upon which the HIP materials are applied have a lattice structure of repeating hollow or partially hollow polyhedrons. See, e.g., FIG. 10A and FIG. 11.

Porous materials (e.g., foams) offer a unique combination of properties that are derived from the cellular structure, making them suitable for use in many structural applications, such as cushioning, and in systems for absorbing the kinetic energy of impacts. However, and because of their cellular structure, there are limits to the macroscopic material properties that can be achieved.

For instance, density and strength tend to be linked such that as one increases so does the other. From a classical model by Gibson and Ashby, and from straightforward dimensional argument, the overall yield strength of the foam $\overline{\sigma}$ is related to the intrinsic strength σ of the solid from which the foam is made of, and to the relative density (P/P$_s$) as shown in equation (2).

$$\overline{\sigma} \propto C\sigma\left(\frac{\overline{P}}{\rho}\right)^n \quad (2)$$

where $\overline{P}$ is the foam density, P is the density of the solid, C is a constant of proportionality that is determined numerically, and the power n depends on the cell geometry (for example, for ideal open cells with low relative densities n=⅔).

Similarly, for the fracture toughness, $\overline{K}$, as shown in equation (3):

$$\overline{K} \propto C_0 \sigma_{fs} \sqrt{\pi L}\left(\frac{\overline{P}}{\rho}\right)^n \quad (3)$$

where $\sigma_{fs}$ is the fracture strength of the solid, and L is the average size of the ligament of unit cell of the foam. These two relations, although derived for ideal cases, show the coupling among the three properties of toughness, strength and density, or equivalently the ligament dimension, and illuminate the limits of properties that can be achieved based on the classical approach to foam design.

Figure 9:
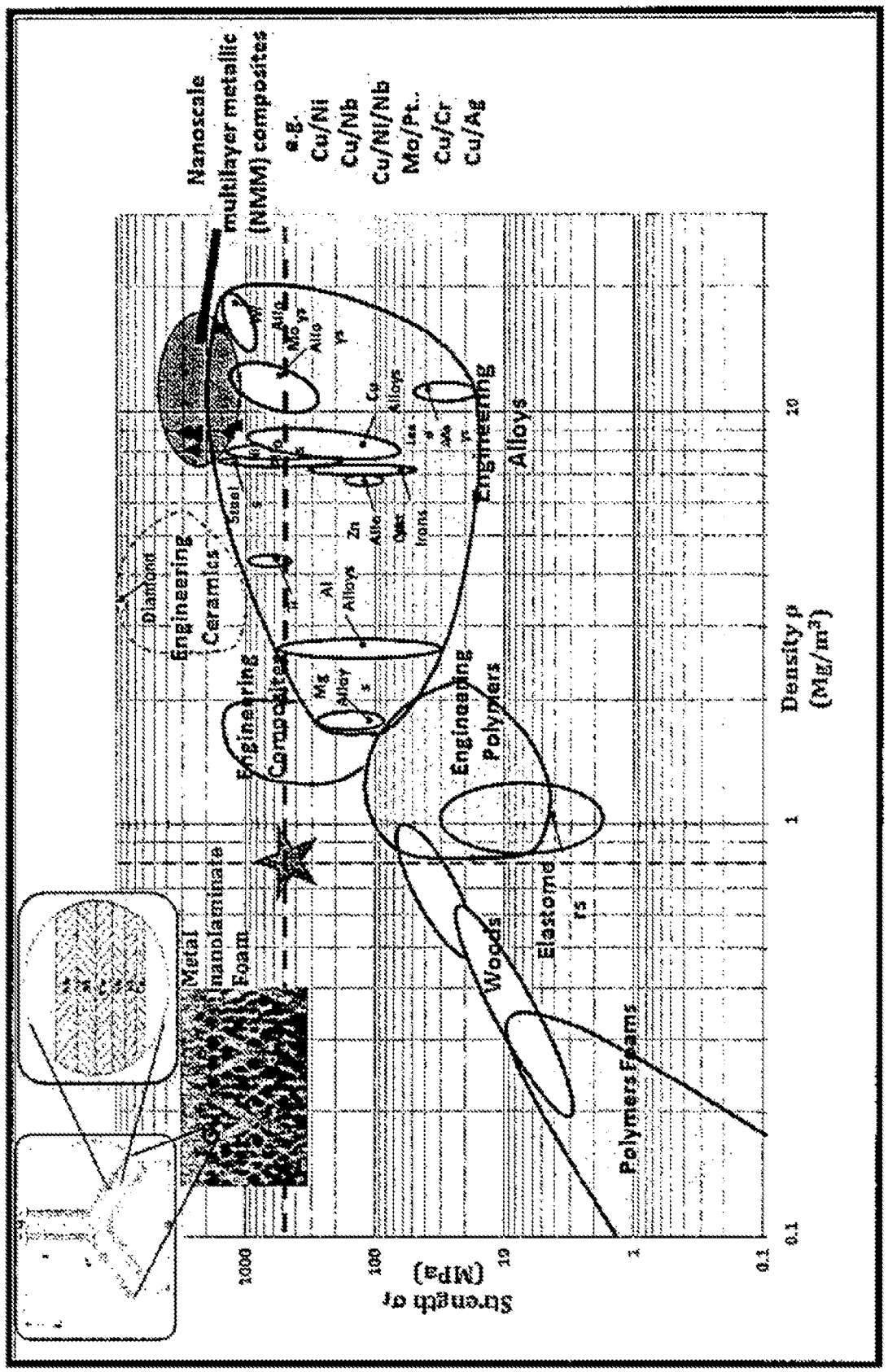
FIG. 9 Shows an Ashby Chart simulation of strength vs. density of materials. Topology optimized HIP material is noted by the star.

While these classical models were developed for materials assuming σ and $\sigma_{fs}$ will remain constant, recent observations of "smaller is stronger" for test specimens on the nm length scale have lent credence to the observations that, if the strength of the solid ($\sigma_s$) increases with decreasing structure size, the overall strength will also increase. This also suggests that an improvement in strength is possible if the ligament can be made of materials with high strength, such as a HIP material with layering on multiple length scales. FIG. 9 is a classical plot of strength versus density (i.e., Ashby Chart) for different materials. With proper design of the thickness of the individual nanolayers with multiple length scales, the strength of these HIP materials can be on the order of GPa and within a fraction of the theoretical strength of any of the constituent metals. Both computational simulations and experiments have shown that these materials exhibit strength 4-5 times greater than the bulk constituent materials.

Creating a porous material (e.g., a foam, a lattice structure, etc.) with multiple length scales to control the overall mechanical properties has been quantified to explicitly describe how changing the strength of a ligament can lead to strengths greater than is expected from the classical model given in equation (2). Balk and co-workers have suggested that the n=3/2 power relationship may not be the appropriate formulation for very small scale structures from comparisons of tension and compression data, but even with a modified exponent the small ligaments seem to provide strength beyond what would be expected on the Ashby plots based on bulk materials, moving towards the "starred" region noted in FIG. 9.

Relying on small scale ligaments to provide exceptional strength, however, is a long term problem for reliable materials. To reach ligament strengths in the GPa range with FCC metals (e.g., gold or nickel), the ligament must be on the order of 10-20 nm. When ligaments of this size are exposed to high temperatures, they coarsen, and their strength decreases. Therefore, the challenge in using a nanoscale ligament is the same issue as the benefit: if the ligament changes in size, the properties of the structure decrease for a given density.

HIP materials provide an elegant way around this conundrum; with nm-layer thick multilayers, ligament (strut) strength will not be controlled by the size of the ligament, but by the size of the nanolayer from which the ligament is made. Therefore, ligaments on the order of 100 μm are easily created while maintaining their GPa strength levels. Thus, it is possible to design a new class of metallized porous materials which possess high strength and low density that lie within the "star" region in the Ashby Chart (FIG. 9). No other material provides this level of property control.

In one embodiment, the HIP materials, e.g., ESM, may be used to produce nanolaminated plates which serve as STANAG-compliant ballistic armor. Such plates demonstrate performance characteristics that are the result of a high density of interfaces comprising a fully-dense modulated laminated material combined with plates, exceeding the mass efficiency of rolled homogenous armor (RHA) steel.

Methods

The present disclosure further provides methods of forming an article of the disclosure. Such methods may comprise depositing a HIP material on a surface of a workpiece. In embodiments, the present disclosure provides a method of forming an article of the disclosure comprising depositing a laminate material having an interface density of at least 2.0 layers/micrometer (μm) on a surface of a workpiece. The methods described herein may be used to form topologically optimized lightweight and ultra-high-performance HIP materials (see, e.g., the SEM in FIG. 2A). In embodiments, the methods include room-temperature processes, such as electrodeposition.

Any suitable technique may be used to deposit a HIP material of the present disclosure. In embodiments, the depositing comprises dipping, vapor deposition, spraying, electrodeposition, electroless deposition, or a combination thereof. In some embodiments, the depositing comprises vapor deposition, spraying, electrodeposition, electroless deposition, or a combination thereof.

In some embodiments, the depositing comprises electrodeposition. In further embodiments, the electrodeposition comprises using potentiometric (potentiostatic), amperometric (galvanostatic), pulse current, pulse reverse current, modulated current, modulated frequency, or continuous transitioned current electroplating. In some such embodiments, the electrodeposition comprises contacting at least a portion of the workpiece with an electrodeposition bath comprising electrodepositable ions; applying a first electric current for a first amount of time to the electrodeposition bath, thereby causing a first layer to be electrodeposited onto the workpiece, the first layer comprising at least a first element and a second element; and applying a second electric current for a second amount of time to the electrodeposition bath, thereby causing a second layer to be electrodeposited onto the first layer, the second layer comprising the first element, the second element, or a combination thereof.

Electrochemical deposition of HIP materials offers the advantage that it is a highly scalable process capable of use in the production of HIP materials on bulk parts. Due to the ability to modulate deposition parameters, including the wave form, temperature, and flow of electrolyte (plating bath), it is possible to manufacture compositionally and microstructurally modulated HIP materials using this production technique. In embodiments, electrodeposition of HIP materials is carried out from a single bath and produces at least first layers and second layers that form at least a portion of the HIP material.

In addition to its scalability and the ability to produce laminated structures, electrodeposition permits the deposition of a variety of materials by electrochemical processes (faradaically or electrophoretically). Electrodepositable materials include metals, ceramics, polymers, preceramic polymers, and additives.

Figure 12:
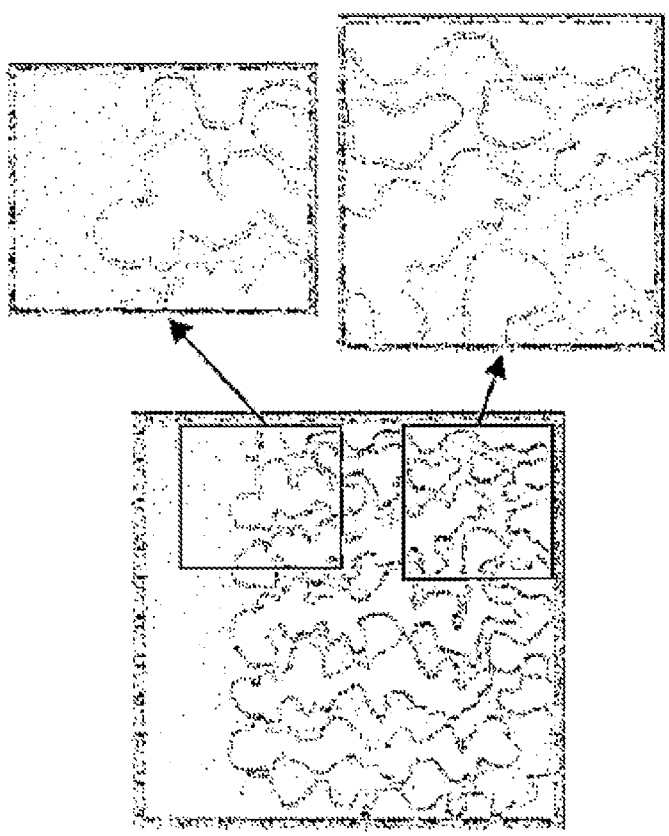
FIG. 12 provides simulated nickel deposition within a porous structure.
Figure 12:
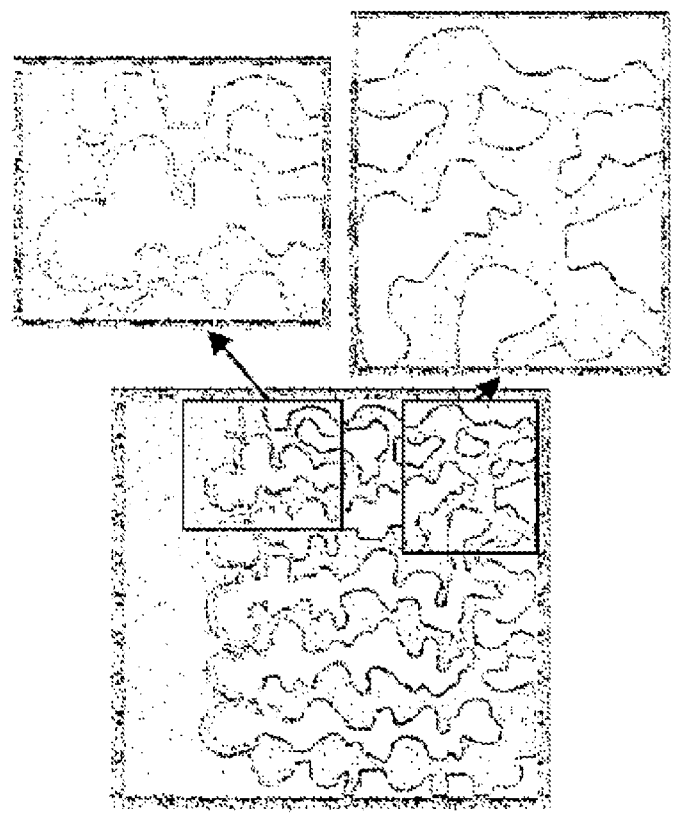
Figure 13C:
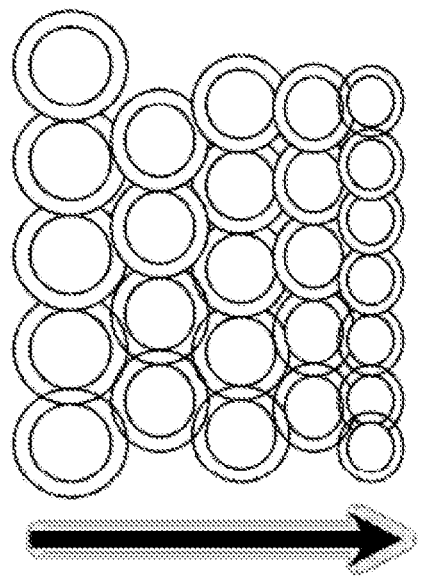
FIGS. 13A-13C depicts three different types of substrate density topography using a cross-sectional view of a foam substrate to exemplify the different topographies.
Figure 13B:
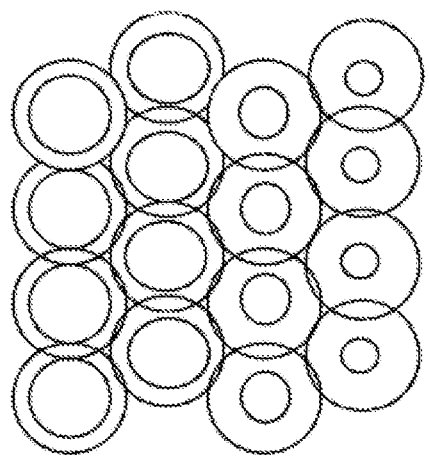
Figure 13A:
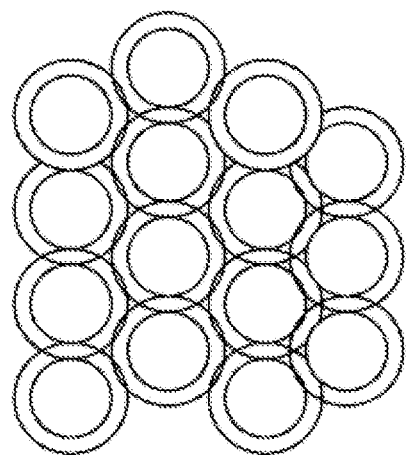
Figure 14:
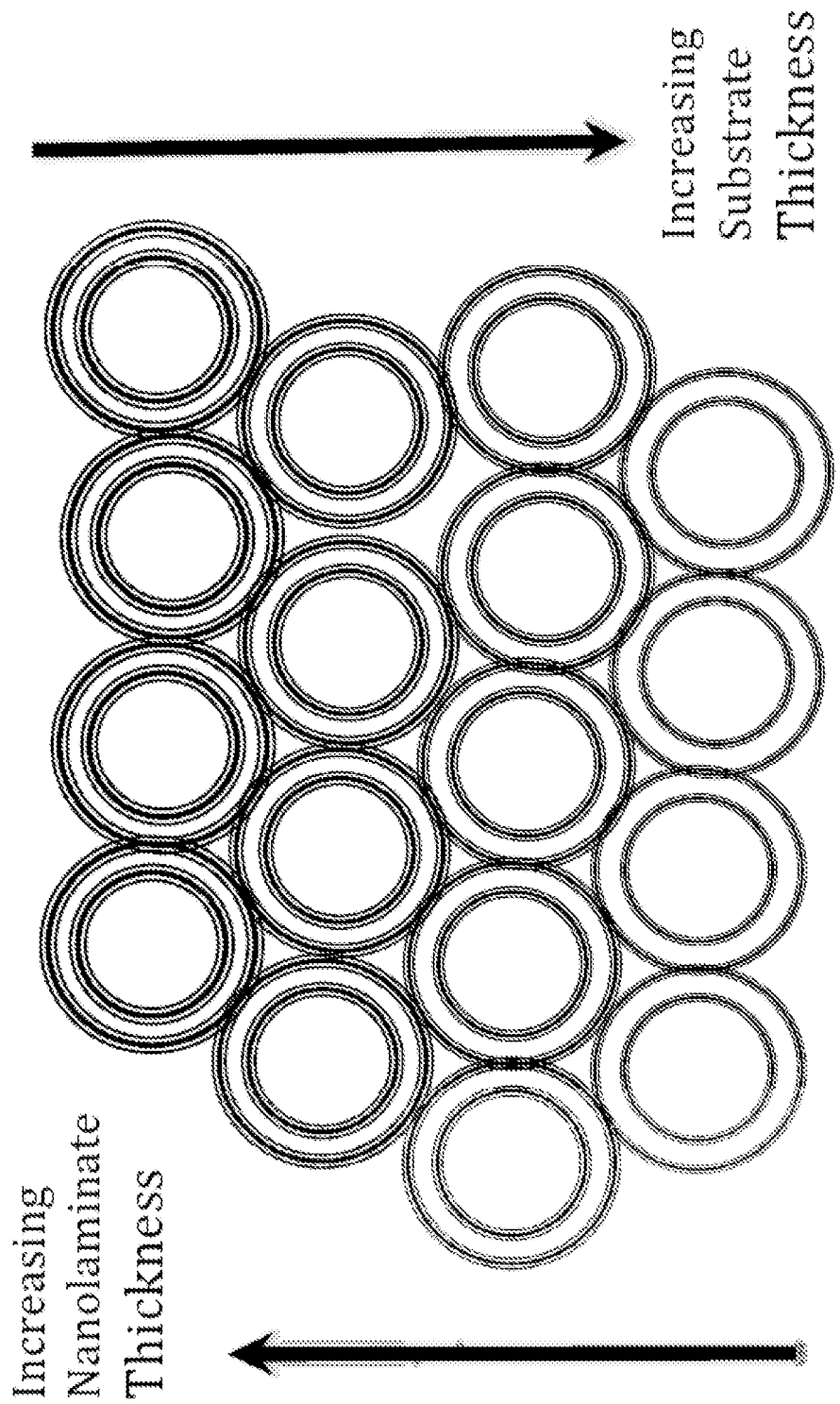
FIG. 14 shows a cross section of a foam substrate to which a metal HIP material has been applied. The foam substrate has variations in both the thickness of the substrate elements making up the cells of the foam substrate and the HIP material. Although the figure shows the gradient in thickness for the substrate elements (walls of the foam cells in this case) increasing in the opposite direction to that of the HIP material thickness, both the laminate material thickness and the thickness of the substrates can vary in the same direction.

Commercially available software by L-Chem, Inc. (e.g., 'Cell-Design') may be utilized to prepare and design electroplating and electroforming processes. Sample Cell-Design simulations showing the deposit thickness distribution within a lattice structure is shown in FIG. 12. The effect of lowering the voltage and the average current density is noted as an example of the system capability in determining density gradation.

Models of the Cell-Design software are capable of simulating a steady-state process or a multiplicity of steady-state steps. However, such software has significant limitations. In alloy deposition, for example, the deposit composition varies as deposition proceeds, from the initial workpiece until a steady composition is reached. This transition is mainly due to the significant dependence of the rate determining exchange current density, $i_0$, on the workpiece composition, which in turn, is a function of the ratio of the individual electrodepositable species partial current densities. When pulsed current is used, particularly with short pulses for generating thin layered structures, these transitions, which are currently not accounted for, are likely to be present throughout the pulse, and will affect the resulting composition and deposit thickness distribution. Furthermore, in very short pulses, transient effects, which also are not considered by such software, are likely to become important. The partial current density depends on the local reactant concentration at the deposition site. Depletion within tortuous cavities, such as within lattice structures, is therefore expected to affect the deposit composition and thickness distribution. While Cell-Design accounts for some transport effects, the time-dependent depletion within the cavities, particularly under pulse plating, requires more rigorous modeling.

An alternative strategy is to employ an average current density for the composition to be plated in the computation over a period $t_n$, where $t_n$ is significantly longer than a single pulse $t_p$ but much shorter than the total deposition time $t_r$, i.e., $t_p \ll t_n < t_r$.

In embodiments, a non-conductive workpiece is rendered conductive prior to electrodeposition. In embodiments where a workpiece is not sufficiently conductive to directly conduct electrodeposition, the workpiece may be treated with electroless plating materials to deposit a layer of conductive material (e.g., copper or nickel). In some embodiments, the methods of the present disclosure provide applying a conductive strike layer to the surface of the workpiece by electroless deposition, the conductive layer being sufficient to render the workpiece sufficiently conductive to permit electrodeposition of the HIP material. Removal of excess electroless materials that can affect electrodeposition may be accomplished by rinsing of the treated workpiece, sonication of the treated workpiece, or both.

A surface of a workpiece may be treated prior to depositing the HIP material. In embodiments, a method of the present disclosure further comprises preparing, prior to applying the HIP material, the surface to increase a surface energy of the surface. In some embodiments, a method of the present disclosure further comprises activating the surface of the workpiece by chemical etch, in-situ etch, mechanical abrasion, removal of material, or a combination thereof. In such embodiments, the activating the surface may comprise plasma etching, mechanical etching, sanding, roughening, or grit blasting.

In embodiments, methods of the present disclosure comprise preparing a workpiece. Workpieces may be prepared using any suitable methods.

In further embodiments, a workpiece is prepared by a process comprising casting, injection molding, blow molding, extrusion molding, cutting, machining, milling, grinding, sanding, polishing, abrasive blasting, three-dimensional printing (3D printing), selective laser sintering (SLS), sintering laser melting (SLM), fused deposition modeling (FDM), stereolithography (SLA), continuous liquid interface printing (CLIP), Vat photopolymerization, binder jetting, directed energy deposition, cutting or forming of woven fabrics, non-woven fabric, or foam sheets, or a combination thereof.

Foam workpieces, particularly polymeric foam workpieces, may be prepared by any means known in the art (e.g., the use of physical or chemical blowing/foaming agents) including blow molding. Where foam workpieces have gradients in cell size they may be prepared using techniques that introduce varying amounts of blowing/foaming agents into the different layers of liquids employed to prepare the foams. Alternatively, a gradient in foam cell size may be achieved by heating thermoplastic foams having substantially uniform cell size to partially collapse the foam. In addition, where steps in foam cell size are desired, foams of different porosity may be used to prepare laminated workpieces.

In embodiments, a workpiece is prepared by additive manufacturing. In some embodiments, an additive manufacturing process comprises direct digital deposition, 3D printing, SLS, SLM, FDM, SLA, CLIP, Vat photopolymerization, binder jetting, directed energy deposition, cutting and/or forming of woven or non-woven fabrics, cutting and/or forming of foam sheets, or a combination thereof.

In embodiments, a workpiece is prepared by a process comprising photopolymerization. As is understood by one of skill in the art, photopolymerization may be accomplished using any suitable methods, such as those described in, e.g., US 2016/0047980, U.S. Pat. Nos. 7,653,279, and 7,653,276, which are incorporated herein by reference for their teachings regarding the same.

A workpiece, regardless of the method of formation, may be prepared such that it is attached to other elements (e.g., foam layers, foam sections, support frames, sheets, and the like). Once formed, the lattice structure and attached elements can be coated with HIP materials (e.g., a metal nanolaminate material) over at least a part of the surface of the workpiece.

In embodiments including sheet(s) (e.g., planar sheets) disposed within the lattice structure, the sheet(s) may be provided with apertures that allow the passage of light when forming the lattice. In such embodiments, the sheet(s) may be suspended in a solution of photopolymerizable monomers prior to illuminating the liquid with a collimated beam of light that is capable of initiating the polymerization process. Alternatively, sheets may be made of a substance that permits a substantial amount of the collimated light beam to be transmitted through the sheet. In embodiments, a solution of polymerizable monomers has a refractive index substantially matched to the sheet at the temperature used for polymerization and at the wavelength of the light used to cause polymerization of the monomers so that the light passes freely through the medium.

Methods of the present disclosure may further comprise removing the workpiece. In some embodiments, a workpiece is removed by a process comprising etching.

EXAMPLES

Example 1

A trimetallic multilayer HIP material comprising nickel-iron-copper is formed. Porous substrates were coated in a sulfate bath to produce laminate layers with varying ratios of NiFeCu to pure Cu layers. XRF of the deposit showed that the laminate material had an average composition of 21% Cu, 24% Fe, and 55% Ni. The NiFeCu nanolaminate was electrodeposited on a substrate via pulse plating. Samples had a Vickers microhardness (tested according to ASTM E384) of 675 HV, ultimate tensile strength of 1291 MPa, yield strength of 1156 MPa, and percent elongation at break of 2.0% (tested according to a modified ASTM E8).

Example 2

Several porous substrates were coated with a nickel aluminum laminate material from a single electroplating bath. Electron dispersive spectroscopy indicated that the deposits had an average aluminum concentration ranging from 0.6% aluminum to nearly pure aluminum, or approximately 99% aluminum, when coated. The NiAl deposit on one substrate was heat treated to allow for interdiffusion and/or intermetallic formation within the laminate material. Coated substrates were heated to 528° C. for 1 hour at 20° C./min and 670° C. for 1 hour at 20° C./min.

Example 3

Porous substrates were coated from a non-aqueous ionic liquid to produce a laminated NiAl—$Al_2O_3$ composite. Compositions were varied using a modulated current density resulting in a Ni composition variation from approximately 90 wt % to substantially 0 wt %. The laminate materials were macroscopically smooth with matte finishes and microstructurally nodular.

Example 4

A laminate material is deposited on a porous substrate from an aqueous bath using a pulsed wave form. The composition of a ceramic layer and an aluminum oxide layer varies between layers.

The following embodiments are included within the scope of the disclosure:

1. A three-dimensional lattice structure, comprising:
   a foam-like material comprising a plurality of interconnected struts forming a lattice comprised of a series of polyhedrons having vertices, the series of polyhedrons forming the lattice extending in at least three different directions (dimensions);
   with some, the majority, or all of the interconnected struts intersecting at the vertices of polyhedrons; and
   optionally comprising one or more solid or perforated sheets having a first and second face on opposite sides of the sheet and forming a connection with at least a portion of the interconnected struts either at vertices or along the strut's length;
   wherein the lattice structure comprises, consists essentially of, or consists of a high interface packing (HIP) material or a coating of HIP material over a substrate.

2. The three-dimensional lattice structure of embodiment 1, comprising one, two, three, four or more perforated or solid sheets.

3. The three-dimensional lattice structure of embodiment 2, wherein one, two, three, four or more, or all of the sheets form substantially flat planes.

4. The three-dimensional lattice structure of any of embodiments 2-3, where struts of the lattice are attached on both the first and second faces of at least one, two, three four or more sheets.

5. The three-dimensional lattice structure of any of embodiments 2-4 wherein the sheets connect greater than four or more, five or more, or six or more of the vertices.

6. The three-dimensional lattice structure of any preceding embodiment comprising greater than $10^2$, $10^3$, $10^4$, or $10^5$ polyhedrons arranged in two or more, three or more, four or more, five or more, or 10 or more planes optionally having at least one of said one or more sheets connecting a plurality of the vertices of said polyhedrons such that at least one of the planes of polyhedrons is disposed on and attached to one face of said one sheet and another of the planes of polyhedrons is on and attached to the second face of said one sheet.

7. The three-dimensional lattice structure of any of embodiments 2-6, wherein a plurality, or greater than $10^2$, $10^3$, $10^4$, $10^5$, $10^6$, or all of the struts define an acute or right angle relative to the sheet, or are normal to the sheet.

8. The three-dimensional lattice structure of any of embodiments 2-6, wherein the one or more sheets has a non-uniform thickness.

9. The three-dimensional lattice structure of any preceding embodiment, wherein the lattice comprises, consists essentially of, or consists of triangulated polyhedrons.

10. The three-dimensional lattice structure of embodiment 9, wherein the triangulated polyhedrons are selected from the group consisting of tetrahedrons, octahedrons, and icosahedrons.

11. The three-dimensional lattice structure of any of embodiments 2-10, wherein the one or more sheet comprises a material selected from the group consisting of metals, metal alloys, laminated metals, nanolaminated metals, composites, fiberglass, ceramics, natural fibers, ceramic fiber cloths, natural fiber cloths, polymeric cloths, metallic cloths, rubbers, plastics, and combinations thereof.

12. The three-dimensional lattice structure of embodiment 1, wherein the spacing between adjacent vertices varies across the lattice in at least one dimension, at least two dimensions (orthogonal directions), or in three dimensions (three orthogonal directions).

13. The three-dimensional lattice structure of any preceding embodiment wherein all, some, or most of the struts are hollow or the struts comprise a core of a second material.

14. The three-dimensional lattice structure of embodiment 13, wherein the struts comprise polymer optical waveguides.

15. The three-dimensional lattice structure of any preceding embodiment, wherein an average length of a strut is selected from about 1 μm to about 10 mm, about 1 μm to about 500 μm, about 10 μm to about 100 μm, about 10 μm to about 500 μm, about 20 μm to about 200 μm, about 20 μm to about 500 μm, about 50 μm to about 300 μm, about 50 μm to about 500 μm, about 0.5 mm to about 1.0 mm, about 0.5 mm to about 5.0 mm, about 1.0 mm to about 5.0 mm, about 0.2 mm to about 2.0 mm, about 0.2 mm to about 5.0 mm, or about 5.0 mm to about 10.0 mm.

16. The three-dimensional lattice structure of any preceding embodiment wherein the lattice comprises a HIP coating on a substrate, wherein the substrate has an increasing density in at least one dimension due to an increasing thickness of the struts or due to smaller polyhedron sizes.

17. The three-dimensional lattice structure of any preceding embodiment further comprising one or more, two or more, three or more, or four or more layers or sections of a foam.

18. The three-dimensional lattice structure of embodiment 17, wherein the foam comprises two or more, three or more, or four or more layers or sections of open cell foam having different cell sizes.

19. The three-dimensional lattice structure of embodiment 17, wherein the layers or sections of foam have an increasing or decreasing cell size in at least one dimension, at least two dimensions (orthogonal directions), or in three dimensions (three orthogonal directions).

20. The three-dimensional lattice structure of any preceding embodiment, wherein the HIP material is present as a coating over a substrate in the form of a three-dimensional lattice structure.

21. The three-dimensional lattice structure of embodiment 20, wherein the coating thickness increases or decreases across at least one dimension.

22. The three-dimensional lattice structure of any preceding embodiment, wherein the HIP material is a laminated or nanolaminate material with layers comprising, consisting essentially of, or consisting of a first type of metal or metal alloy, and layers comprising, consisting essentially of, or consisting of a second type of metal or metal alloy, wherein the metal or metal alloy is selected independently for each layer.

23. The three-dimensional lattice structure of any preceding embodiment, wherein the HIP structure comprises two or more, three or more, 5 or more, 10 or more, 50 or more, 100 or more, 500 or more, or 1,000 or more layers that are 1-1,000, 1-5, 1-10, 1-100, 2-10, 2-50, 2-100, 5-20, 5-100, 5-200, 10-100, 10-200, 10-300, 10-500, 20-100, 20-400, 50-250, 100-200, 100-500, 200-500, or 500-1,000 nm thick.

24. The three-dimensional lattice structure of any of embodiments 22-23, wherein the layers comprising, consisting essentially of, or consisting of the first and second types of metal or metal alloy differ in one, two, three, or more properties selected from the group consisting of: chemical (elemental) composition, grain size, defect density, grain orientation, presence of intermetallic compositions, and presence of amorphous metallic glass compositions/content; with the proviso that, when the layers of the first and second types have the same chemical (elemental) composition, the layers differ in at least one other property.

25. The three-dimensional lattice structure of embodiment 23, wherein the layers of the first type and/or the layers of the second type comprise a fine-grained metal or metal alloy having an average grain size selected independently for any one, two, three, four, five, six, or more layers from a range of 1 nm to 5,000 nm, 1-20 nm, 1-100 nm, 5-30 nm, 5-50 nm, 5-100 nm, 5-200 nm, 10-100 nm, 10-200 nm, 20-200 nm, 20-250 nm, 20-500 nm, 50-250 nm, 50-500 nm, 100-500 nm, 200-1,000 nm, 500-2,000 nm, and 1,000-5,000 nm, based on the measurement of grain size in micrographs, provided the grain size is less than the thickness of the layer containing the grains.

26. The three-dimensional lattice structure of embodiment 25, wherein the fine-grained metals and alloys have a high degree of twinning between metal grains, and remain ductile while exhibiting an increase in one or more properties selected from hardness, tensile strength, and corrosion resistance relative to an electrodeposited metal or alloy of the same composition with a grain size from 5,000 to 20,000 nm or greater.

27. The three-dimensional lattice structure of any of embodiments 22-26, wherein the layers of the first type and/or the second type comprise one, two, three, four, or more elements selected independently for each layer from the group consisting of Ag, Al, Au, B, Be, C, Cr, Cu, Fe, Hg, In, Ir, Mg, Mn, Mo, Nb, Nd, P, Pd, Pt, Re, Rh, Sb, Si, Sn, Pb, Ta, Ti, W, V, Zn, and Zr.

28. The three-dimensional lattice structure of any of embodiments 22-27, wherein the layers of the first type and/or the second type comprise two or more or three or more elements selected independently for each layer from the group consisting of Ag, Al, Au, B, Be, C, Cr, Cu, Fe, Hg, In, Ir, Mg, Mn, Mo, Nb, Nd, P, Pd, Pt, Re, Rh, Sb, Si, Sn, Pb, Ta, Ti, W, V, Zn, and Zr.

29. The three-dimensional lattice structure of any of embodiments 22-28, wherein the layers of the first type and the second type taken together comprise, consist essentially of, or consist of a combination of elements selected from the group consisting of: AlZn, AlSi, CuNb, CuNi, NiFe, AlFe, NiAl, NiCr, NiCo, NiCrCo, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiNb, NiCrNb, NiFeNb, NiCoNb, NiCrCoNb, NiTi, NiCrTi, NiFeTi, NiCoTi, NiCrCoTi, NiCrP, NiCoP, NiFeP, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, and FeCrB, with the proviso that neither the layers of the first type nor the layers of the second type must contain all elements in combination and that taken together the layers of the first type and the second type comprise all elements recited in the combination.

30. The three-dimensional lattice structure of any of embodiments 22-29, wherein the combination of elements is selected from the group consisting of: AlSi, CuNb, CuNi, NiFe, AlFe, and NiAl.

31. The three-dimensional lattice structure of any of embodiments 22-30, wherein the HIP material is formed by vapor deposition, spraying, electrodeposition and/or electroless deposition.

32. The three-dimensional lattice structure of any of embodiments 17-31, wherein the HIP materials present form on at least a portion of the outermost surface a layer that is greater than 60, 70, 80, 90, 95, 98, 99 percent dense or a fully dense layer.

33. The three-dimensional lattice structure of any preceding embodiment, wherein
the strut length is selected from 1 μm to about 500 μm, about 10 μm to about 100 μm, about 10 μm to about 200 μm, about 10 μm to about 500 μm, about 20 μm to about 200 μm, about 20 μm to about 500 μm, about 50 μm to about 300 μm, about 50 μm to about 500 μm, about 75 μm to about 250 μm, about 75 μm to about 500 μm, about 100 μm to about 300 μm, and about 100 μm to about 500 μm, and
the HIP material comprises 100 or more, 500 or more, or 1,000 or more layers that are 1-500, 1-10, 1-100, 2-10, 2-50, 2-100, 5-20, 5-100, 5-200, 10-100, 10-200, 10-300, 10-500, 20-100, 20-400, 50-250, 100-200, 100-500, or 200-500 nm thick.

34. The three-dimensional lattice structure of embodiment 33, wherein the structure has a strength from about 200 MPa to about 900 MPa.

35. An article comprising:
a laminate material having a void volume of at least 40%, the laminate material having an interface density of at least 2.0 interfaces/micrometer (µm).

36. The article of embodiment 35, wherein the laminate material has a lattice structure comprising a plurality of interconnected struts forming polyhedrons in a series that extends in three dimensions.

37. An article comprising:
a laminate material having a lattice structure comprising a plurality of interconnected struts forming polyhedrons in a series that extends in three dimensions, the laminate material having an interface density of at least 2.0 interfaces/micrometer (µm).

38. The article of any one of embodiments 35-37, further comprising a workpiece, wherein the laminate material is on a surface of the workpiece.

39. The article of embodiment 38, wherein the workpiece is an open cell foam.

40. The article of embodiment 39, wherein a cell size of the open cell foam varies in at least one dimension.

41. The article of any one of embodiments 38-40, wherein the workpiece comprises a polymer.

42. The article of embodiment 41, wherein the polymer comprises an acrylamide, an arylamide, polybenzimidazole (PBI), polyetherimide, polyetherketoneketone (PEKK), polyether ether ketone (PEEK), polyamide, polyimide, a polyamide-imide, polyphenylene oxide (PPO), polystyrene (PS), polyphenylene oxide (PPO) and polystyrene (PS), polyphthalamide (PPA), polyvinyl alcohol (PVA), acrylonitrile butadiene styrene (ABS), polycarbonate (PC), polylactic acid (PLA), PC/ABS, cellulose fiber, polyphenylsulfone (PPSU), a thermoset, PBI-PEEK, urea, an epoxy, a cyanate ester, a polyurethane, or a combination thereof.

43. The article of any one of embodiments 38-40, wherein the workpiece comprises a metal.

44. The article of any one of embodiments 36-43, wherein the polyhedrons are irregular.

45. The article of any one of embodiments 36-43, wherein the polyhedrons are regular.

46. The article of any one of embodiments 36-45, wherein the series of polyhedrons comprises greater than 100 polyhedrons arranged in two or more planes.

47. The article of any one of embodiments 36-46, wherein the series of polyhedrons comprises greater than 1,000 polyhedrons arranged in two or more planes.

48. The article of any one of embodiments 36-47, wherein the series of polyhedrons comprises greater than 10,000 polyhedrons arranged in two or more planes.

49. The article of any one of embodiments 36-48, wherein the series of polyhedrons are arranged in three or more planes.

50. The article of any one of embodiments 36-49, wherein the series of polyhedrons are arranged in four or more planes.

51. The article of any one of embodiments 36-50, wherein the series of polyhedrons are arranged in five or more planes.

52. The article of any one of embodiments 36-51, wherein the polyhedrons comprise triangulated polyhedrons.

53. The article of embodiment 52, wherein the triangulated polyhedrons comprise tetrahedrons, octahedrons, and icosahedrons.

54. The article of any one of embodiments 36-53, wherein a size of the polyhedrons varies in at least one dimension.

55. The article of embodiment 54, wherein the size of the polyhedrons varies through a depth of the lattice structure.

56. The article of any one of embodiments 36-55, wherein the plurality of interconnected struts is hollow.

57. The article of any one of embodiments 36-556, wherein the lattice structure comprises a hollow cavity surrounded by a plurality of the polyhedrons.

58. The article of any one of embodiments 36-57, wherein the plurality of interconnected struts has an average length of about 0.5 micrometers (µm) to about 10 millimeters (mm).

59. The article of any one of embodiments 36-58, wherein the plurality of interconnected struts has an average length of about 1 µm to about 500 µm.

60. The article of any one of embodiments 36-59, wherein the plurality of interconnected struts has an average length of about 0.5 mm to about 5.0 mm.

61. The article of any one of embodiments 36-60, wherein a thickness of the plurality of interconnected struts varies in at least one dimension.

62. The article of embodiment 61, wherein the thickness of the plurality of interconnected struts varies through a depth of the lattice structure.

63. The article of any one of embodiments 35-62, wherein a thickness of the laminate material varies in at least one dimension.

64. The article of embodiment 63, wherein the thickness of the laminate material varies through a depth of the lattice structure.

65. The article of any one of embodiments 35-64, wherein the laminate material comprises first layers having a first composition and second layers having a second composition.

66. The article of embodiment 65, wherein the laminate material comprises alternating first layers and second layers.

67. The article of embodiment 65 or 66, wherein the first layers and the second layers differ in at least one of grain size, defect density, grain orientation, presence of intermetallic compositions, presence of amorphous metallic glass content, or a combination thereof.

68. The article of any one of embodiments 35-67, wherein the laminate material comprises at least five layers.

69. The article of any one of embodiments 35-68, wherein the laminate material comprises at least 100 layers.

70. The article of any one of embodiments 35-69, wherein the laminate material comprises layers that independently have a thickness ranging from about 1 nm to about 1,500 nm.

71. The article of any one of embodiments 35-70, wherein the laminate material comprises layers that independently have a thickness ranging from about 1 nm to about 1,000 nm.

72. The article of any one of embodiments 35-71, wherein the laminate material comprises layers that independently have a thickness ranging from about 2 nm to about 100 nm.

73. The article of any one of embodiments 35-72, wherein the laminate material comprises layers that independently have a thickness ranging from about 5 nm to about 70 nm.

74. The article of any one of embodiments 65-73, wherein the first layers independently have an average grain size ranging from about 1 nm to 1,000 nm based on a grain size measurement in micrographs.

75. The article of any one of embodiments 65-74, wherein the second layers independently have an average grain size ranging from about 1,000 nm to 5,000 nm based on a grain size measurement in micrographs.

76. The article of embodiment 74 or 75, wherein the first layers and the second layers have a high degree of twinning, and the laminate material has an increase in hardness, tensile strength, corrosion resistance, or a combination thereof relative to an electrodeposited metal or alloy having the same average composition with a grain size of at least 5,000 nm.

77. The article of any one of embodiments 65-76, wherein the first layers independently comprise Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, Zr, or combinations thereof.

78. The article of any one of embodiments 65-77, wherein the second layers independently comprise Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, Zr, or combinations thereof.

79. The article of any one of embodiments 65-78, wherein the first layers and the second layers comprise AlSi, CuNb, CuNi, NiFe, AlFe, or NiAl.

80. The article of any one of embodiments 35-79, wherein the laminate material comprises AlZn, AlSi, CuNb, CuNi, NiFe, AlFe, NiAl, NiCr, NiCo, NiCrCo, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiFeP, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, or FeCrB.

81. The article of any one of embodiments 35-80, wherein the laminate material forms a surface layer having a density of at least 60%.

82. The article of embodiment 81, wherein the density of the surface layer is at least 80%.

83. The article of embodiment 82, wherein the density of the surface layer is at least 95%.

84. The article of embodiment 83, wherein the density of the surface layer is at least 99%.

85. The article of embodiment 84, wherein the surface layer is fully dense.

86. The article of any one of embodiments 35-85, wherein the interface density is at least about 5 interfaces/$\mu$m.

87. The article of any one of embodiments 35-86, wherein the interface density is at least about 10 interfaces/$\mu$m.

88. The article of any one of embodiments 35-87, wherein the interface density is at least about 20 interfaces/$\mu$m.

89. The article of any one of embodiments 35-88, wherein the interface density is at least about 500 interfaces/$\mu$m.

90. The article of any one of embodiments 37-89, wherein the laminate material has a void volume of at least 40%.

91. The article of any one of embodiments 35, 36, 38-90, wherein the void volume is at least 60%.

92. The article of embodiment 91, wherein the void volume is at least 80%.

93. The article of embodiment 92, wherein the void volume is at least 90%.

94. The article of any one of embodiments 35-93, further comprising a conductive strike layer in contact with the laminate material.

95. The article of embodiment 94, wherein the conductive strike layer is in contact with the workpiece.

96. The article of any one of embodiments 36-95, further comprising a sheet in contact with at least a portion of the plurality of interconnected struts.

97. The article of embodiment 96, wherein the sheet is perforated.

98. The article of embodiment 96, wherein the sheet is solid.

99. The article of any one of embodiments 96-98, wherein the sheet is substantially planar.

100. The article of any one of embodiments 96-99, wherein a first side and a second side of the sheet are in contact with a portion of the plurality of interconnected struts.

101. The article of any one of embodiments 96-100, wherein the sheet is in contact with two or more vertices of the plurality of interconnected struts.

102. The article of any one of embodiments 96-101, wherein the sheet is in contact with two or more of the plurality of interconnected struts along a length of the two or more of the plurality of interconnected struts.

103. The article of any one of embodiments 96-102, wherein a face of at least one polyhedron of the series of polyhedrons is substantially parallel to and in contact with a first side or a second side of the sheet.

104. The article of any one of embodiments 96-103, further comprising a plurality of sheets in contact with at least a portion of the plurality of interconnected struts.

105. The article of any one of embodiments 96-104, wherein a portion of the plurality of the interconnected struts forms a right angle relative to the sheet.

106. The article of any one of embodiments 96-105, wherein a portion of the plurality of the interconnected struts forms an acute angle relative to the sheet.

107. The article of any one of embodiments 96-106, wherein the sheet has a uniform thickness.

108. The article of any one of embodiments 96-106, wherein the sheet has a non-uniform thickness.

109. The article of any one of embodiments 96-108, wherein the sheet comprises a material selected from the group consisting of metals, metal alloys, laminated metals, nanolaminated metals, composites, fiberglass, ceramics, natural fibers, ceramic fiber cloths, natural fiber cloths, polymeric cloths, metallic cloths, rubbers, plastics, and combinations thereof.

110. A method of forming an article of any one of embodiments 35-109, comprising:
   depositing a laminate material having an interface density of at least 2.0 layers/micrometer ($\mu$m) on a surface of a workpiece.

111. The method of embodiment 110, wherein the depositing comprises vapor deposition, spraying, electrodeposition, electroless deposition, or a combination thereof.

112. The method of embodiment 111, wherein the depositing comprises electrodeposition.

113. The method of embodiment 112, wherein the electrodeposition comprises using potentiometric (potentiostatic), amperometric (galvanostatic), pulse current, pulse reverse current, modulated current, modulated frequency, or continuous transitioned current electroplating.

114. The method of any one of embodiments 110-113, further comprising applying a conductive strike layer to the surface of the workpiece by electroless deposition, the conductive layer being sufficient to render the workpiece sufficiently conductive to permit electrodeposition of the laminate material.

115. The method of any one of embodiments 110-114, further comprising preparing, prior to applying the laminate material, the surface to increase a surface energy of the surface.

116. The method of any one of embodiments 110-115, further comprising activating the surface of the workpiece by chemical etch, in-situ etch, mechanical abrasion, removal of material, or a combination thereof.

117. The method of embodiment 116, wherein the activating the surface comprises plasma etching, mechanical etching, sanding, roughening, or grit blasting.

118. The method of any one of embodiments 111-117, wherein the electrodeposition comprises:
  contacting at least a portion of the workpiece with an electrodeposition bath comprising electrodepositable ions;
  applying a first electric current for a first amount of time to the electrodeposition bath, thereby causing a first layer to be electrodeposited onto the workpiece, the first layer comprising at least a first element and a second element; and
  applying a second electric current for a second amount of time to the electrodeposition bath, thereby causing a second layer to be electrodeposited onto the first layer, the second layer comprising the first element, the second element, or a combination thereof.

119. The method of any one of embodiments 110-118, further comprising preparing the workpiece.

120. The method of embodiment 119, wherein the preparing comprises additive manufacturing.

121. The method of embodiment 119 or 120, wherein the preparing comprises casting, injection molding, blow molding, extrusion molding, cutting, machining, milling, grinding, sanding, polishing, abrasive blasting, three-dimensional printing (3D printing), selective laser sintering (SLS), sintering laser melting (SLM), fused deposition modeling (FDM), stereolithography (SLA), continuous liquid interface printing (CLIP), Vat Photopolymerization, binder jetting, directed energy deposition, cutting or forming of woven fabrics, non-woven fabric, or foam sheets, or a combination thereof.

122. The method of any one of embodiments 119-121, wherein the preparing comprises photopolymerization.

123. The method of any one of embodiments 110-122, further comprising removing the workpiece.

124. The method of embodiment 123, wherein removing the workpiece comprising etching the workpiece.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including U.S. Patent Application No. 62/416,619, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An article, comprising:
  a laminate material on a surface of a substrate having a lattice structure comprising a plurality of interconnected struts forming polyhedrons in a series that extends in three dimensions, the plurality of interconnected struts being arranged so that the laminate material has a void volume of at least 40%, and the laminate material comprising a plurality of alternating first layers and second layers and having an interface density of at least 2.0 interfaces/micrometer (μm),
  wherein:
  the substrate is a graded workpiece have a density gradient along a planar direction of the substrate due to an increase in thickness of the interconnecting struts along the planar direction of the substrate;
  the laminate material is a metal nanolaminate material;
  the first layers and the second layers differ in at least one of grain size, defect density, grain orientation, presence of intermetallic compositions, presence of amorphous metallic glass content, or a combination thereof;
  the first layers comprise a first metal or a first metal alloy having an average grain size ranging from about 1 nm to 1,000 nm based on a grain size measurement in micrographs;
  the second layers comprise a second metal or a second metal alloy having an average grain size ranging from about 1,000 nm to 5,000 nm based on a grain size measurement in micrographs; and
  the interface density is defined by the following formula:

$$(L-1)/T,$$

wherein:
    L is a number of layers; and
    T is a total thickness of the layers.

2. The article of claim 1, wherein the polyhedrons comprise tetrahedrons, octahedrons, or icosahedrons.

3. The article of claim 1, wherein the plurality of interconnected struts is hollow.

4. The article of claim 1, wherein the first layers and the second layers have a high degree of twinning, and the laminate material has an increase in hardness, tensile strength, corrosion resistance, or a combination thereof relative to an electrodeposited metal or alloy having the same average composition with a grain size of at least 5,000 nm.

5. The article of claim 1, wherein the first layers and the second layers independently comprise Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, Zr, or combinations thereof.

6. The article of claim 1, wherein the first layers and the second layers comprise AlSi, CuNb, CuNi, NiFe, AlFe, or NiAl.

7. The article of claim 1, wherein the laminate material comprises AlZn, AlSi, CuNb, CuNi, NiFe, AlFe, NiAl, NiCr, NiCo, NiCrCo, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiFeP, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, or FeCrB.

8. The article of claim 1, wherein the laminate material forms a surface layer having a density of at least 60%.

9. The article of claim 1, further comprising a conductive strike layer in contact with the laminate material.

10. The article of claim 1, further comprising a sheet in contact with at least a portion of the plurality of interconnected struts.

11. The article of claim 10, wherein the sheet is in contact with two or more vertices of the plurality of interconnected struts.

12. The article of claim 10, wherein a face of at least one polyhedron of the series of polyhedrons is substantially parallel to and in contact with a first side or a second side of the sheet.

13. The article of claim 1, further comprising a plurality of sheets in contact with at least a portion of the plurality of interconnected struts.

14. The article of claim 13, wherein a portion of the plurality of the interconnected struts forms a right angle relative to the sheet.

15. The article of claim 13, wherein a portion of the plurality of the interconnected struts forms an acute angle relative to the sheet.

16. The article of claim 1, wherein the laminate material further comprises one or more additional layer between any first and second layers.

17. The article of claim 1, wherein the first layers have a first composition and second layers having a second composition that is different than the first composition.

18. The article of claim 17, wherein the laminate material comprises at least 50 layers.

19. The article of claim 1, wherein a defect density of the laminate material is graded across a thickness of the laminate layer.

20. The article of claim 1, wherein the plurality of interconnected struts has an average length from 1 µm to 500 µm.

21. The article of claim 1, wherein the graded workpiece includes a maximum density such that density increases to a maxima point within the graded workpiece, and then decreases along the planar direction of the substrate due to a decrease in thickness of the interconnecting struts along the planar direction of the substrate.

22. The article of claim 21, wherein the graded workpiece includes a minimum density such that density decreases to a minima point within the graded workpiece, and then increases along the planar direction of the substrate due to the increase in thickness of the interconnecting struts along the planar direction of the substrate.

23. The article of claim 22, wherein the graded workpiece has multiple density maxima, multiple density minima, or a combination thereof, within the graded workpiece.

24. A method of forming the article of claim 1, the method comprising:
depositing the laminate material on a surface of the graded workpiece.

* * * * *